US010812556B2

(12) United States Patent
Masuda

(10) Patent No.: US 10,812,556 B2
(45) Date of Patent: *Oct. 20, 2020

(54) INFORMATION PROCESSING APPARATUS, INFORMATION PROCESSING METHOD, AND PROGRAM

(71) Applicant: SONY CORPORATION, Tokyo (JP)

(72) Inventor: Yasuto Masuda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 169 days.

This patent is subject to a terminal disclaimer.

(21) Appl. No.: 15/805,276

(22) Filed: Nov. 7, 2017

(65) Prior Publication Data
US 2018/0084025 A1 Mar. 22, 2018

Related U.S. Application Data

(63) Continuation of application No. 14/432,229, filed as application No. PCT/JP2013/006077 on Oct. 11, 2013, now Pat. No. 9,876,835.

(30) Foreign Application Priority Data

Nov. 2, 2012 (JP) .................. 2012-243011

(51) Int. Cl.
H04L 29/06 (2006.01)
H04N 21/24 (2011.01)
(Continued)

(52) U.S. Cl.
CPC .......... H04L 65/602 (2013.01); H04L 65/607 (2013.01); H04L 65/80 (2013.01);
(Continued)

(58) Field of Classification Search
CPC ............... H04L 1/1812; H04L 65/4084; H04L 2012/5681; G06F 15/16; G06F 3/1236; G06F 13/126
(Continued)

(56) References Cited

U.S. PATENT DOCUMENTS 7,983,455 B2 * 7/2011 Moise ..................... G06K 9/24
235/380
2005/0254427 A1 11/2005 Leon et al.
(Continued)

FOREIGN PATENT DOCUMENTS

JP 2002-262262 A 9/2002
JP 2009-188981 A 8/2009
(Continued)

OTHER PUBLICATIONS

International Search Report dated Nov. 19, 2013 in PCT/JP2013/006077.
(Continued)

Primary Examiner — Tesfay Yohannes
(74) Attorney, Agent, or Firm — Oblon, McClelland, Maier & Neustadt, L.L.P.

(57) ABSTRACT

An information processing apparatus includes a communication unit and a control unit. The communication unit is communicable with a plurality of client apparatuses over the same network that are capable of buffering and reproducing data transmitted from a server by progressive download. The control unit is capable of regularly obtaining buffer time information indicating a buffer time that expresses an amount of data buffered by the plurality of client apparatuses using a time necessary for reproduction of the data. Further, the control unit is capable of determining a client apparatus whose buffer time is minimum among the plurality of client apparatuses as a priority apparatus to which the data should be preferentially transmitted.

18 Claims, 20 Drawing Sheets

(51) Int. Cl.
*H04N 21/262* (2011.01)
*H04N 21/44* (2011.01)

(52) U.S. Cl.
CPC ... *H04N 21/2401* (2013.01); *H04N 21/26216* (2013.01); *H04N 21/44004* (2013.01)

(58) Field of Classification Search
USPC .......................... 709/217, 219; 370/310, 235
See application file for complete search history.

(56) References Cited

U.S. PATENT DOCUMENTS

| | | | |
|---|---|---|---|
| 2005/0254499 A1 | 11/2005 | Leon et al. | |
| 2005/0286422 A1* | 12/2005 | Funato | H04L 47/14 370/235 |
| 2009/0125429 A1* | 5/2009 | Takayama | G06Q 20/04 705/35 |
| 2010/0008350 A1* | 1/2010 | Yang | H04L 69/22 370/349 |
| 2010/0333148 A1 | 12/2010 | Musha et al. | |
| 2011/0078324 A1 | 3/2011 | Honma et al. | |
| 2011/0317598 A1* | 12/2011 | Takagi | H04L 1/0067 370/310 |
| 2012/0324308 A1* | 12/2012 | Goto | H04L 1/005 714/752 |
| 2013/0091245 A1* | 4/2013 | Miyashita | H04L 69/32 709/217 |
| 2013/0097378 A1* | 4/2013 | Taguchi | H04L 49/9078 711/114 |
| 2013/0100970 A1* | 4/2013 | Vafin | H04L 1/0036 370/517 |
| 2013/0136218 A1* | 5/2013 | Kure | H04L 7/0041 375/356 |
| 2014/0354571 A1* | 12/2014 | Hatakeda | G06F 1/1671 345/173 |
| 2015/0155044 A1* | 6/2015 | Yin | G06F 3/0611 365/185.24 |
| 2015/0193360 A1* | 7/2015 | Lu | G06F 13/24 710/48 |
| 2015/0227246 A1* | 8/2015 | Ogawa | G06F 3/0227 345/174 |

FOREIGN PATENT DOCUMENTS

| | | |
|---|---|---|
| JP | 2011-9904 A | 1/2011 |
| JP | 2011-77597 A | 4/2011 |

OTHER PUBLICATIONS

Extended European Search Report dated Mar. 2, 2018 in Patent Application No. 17204200.4.
Rémi Houdaille, et al., "Shaping HTTP adaptive streams for a better user experience", Proceeding MMSys '12 Proceedings of the 3$^{rd}$ Multimedia Systems Conference, http://delivery.acm.org/10.1145/2160000/2155557/p1-houdaille.pdf?ip=145.64.134.247&acc=ACTIVESERVICE&key=986B26D8D17D60C88D75A192E3112143&CFID=345973102&CFTOKEN=60511403&_acm_=1373363783_7b31d4d928d3d3b14ed105f774986df7, XP055070341, 2012, 9 pages.

* cited by examiner

| Stream ID | IP address | Port number | Buffer time |
|---|---|---|---|
| 1 | 192.168.1.1 | 37673 | 00:00:23 |
| 2 | 192.168.1.2 | 47991 | 00:00:17 |
| 3 | 192.168.1.4 | 40139 | 00:01:35 |

| Stream ID | IP address | Port number | Encoding rate | Buffer time |
|---|---|---|---|---|
| 1 | 192.168.1.1 | 37673 | 4Mbps | 00:00:23 |
| 2 | 192.168.1.2 | 47991 | 2Mbps | 00:00:17 |
| 3 | 192.168.1.4 | 40139 | 1Mbps | 00:01:35 |

Packet reception processing

Reproduction processing

INFORMATION PROCESSING APPARATUS, INFORMATION PROCESSING METHOD, AND PROGRAM

CROSS REFERENCE TO RELATED APPLICATION

The present application is a continuation of U.S. application Ser. No. 14/432,229, filed on Mar. 30, 2015, now pending, which was the national phase of international Application No. PCT/JP13/06077, filed on Oct. 11, 2013, which claimed priority to Japanese Application No. 2012-243011, filed on Nov. 2, 2012. The entire contents of all of the above-listed applications are incorporated herein by reference.

TECHNICAL FIELD

The present technology relates to an information processing apparatus capable of transmitting and receiving data of a moving image or the like via a network, and to an information processing method and a program in such an information processing apparatus.

BACKGROUND ART

Conventionally, as a reproduction method for data of a moving image or the like via a network, there is known progressive download in which data is downloaded and reproduced using an HTTP protocol.

In the case where a plurality of terminals download and reproduce moving image data over a network by progressive download at the same time, even if a certain band is ensured for them, some terminals may not be capable of reproducing smoothly the moving image data.

This is because, in the progressive download, the band is evenly distributed to a plurality of terminals. That is, as a result of evenly distributing the band to the plurality of terminals, the band is insufficient for moving image data encoded at a high rate and the band is excessive for moving image data encoded at a low rate. Thus, in the terminal that reproduces the moving image data encoded at a high rate, a data accumulation amount in a buffer becomes insufficient and the reproduction thereof may be interrupted.

As a conventional technique that solves such a problem, there is a static band control between terminals. In this technique, a band is set for each terminal according to an encoding rate of moving image data scheduled to be downloaded by each terminal. That is, in a single network, a sufficiently wide band is allocated to the terminal that reproduces moving image data encoded at a high rate for reproduction thereof and a relatively narrow band is allocated to the terminal that reproduces a moving image encoded at a low rate.

Further, as a document relating to the progressive download, there is Patent Document 1 below. This Patent Document 1 describes that, when a reception terminal is instructed to perform progressive download, a resource (bus band, CPU, etc.) used in another stream processing in the reception terminal is dynamically allocated to progressive download processing and a part not yet downloaded is downloaded at a high speed to prevent the reproduction from being interrupted.

Patent Document 1: Japanese Patent Application Laid-open No. 2009-188981

SUMMARY OF INVENTION

Problem to be Solved by the Invention

However, in the static band control, an upper limit of a download band in the network is fixed and hence it lacks flexibility. In particular, there is a problem that the band is not effectively used in a wireless LAN environment. Specifically, if a radio wave condition is deteriorated in the terminal to which a large band is allocated and the throughput is lowered, the corresponding band becomes available. However, other terminals cannot use the available band for increasing the accumulation amount of the buffer. Further, even if the radio wave condition is restored, the accumulation amount of the buffer that has been reduced due to the lowering of the throughput is not restored.

Further, in the technique described in the Patent Document 1, the single reception terminal controls the throughput according to a content distribution (reproduction) method while the band cannot be dynamically distributed among the plurality of terminals.

In view of the above-mentioned situations, it is an object of the present technology to provide an information processing apparatus, an information processing system, an information processing method, and a program, by which data transmitted by progressive download can be smoothly reproduced by dynamically distributing a band among a plurality of terminals.

Means for Solving the Problem

In order to solve the above-mentioned problems, an information processing apparatus according to an embodiment of the present technology includes a communication unit and a control unit. The communication unit is communicable with a plurality of client apparatuses over the same network that are capable of buffering and reproducing data transmitted from a server by progressive download. The control unit is capable of regularly obtaining buffer time information indicating a buffer time that expresses an amount of data buffered by the plurality of client apparatuses using a time necessary for reproduction of the data. Further, the control unit is capable of determining a client apparatus whose buffer time is minimum among the plurality of client apparatuses as a priority apparatus to which the data should be preferentially transmitted.

With this, the information processing apparatus can determine the priority apparatus based on the buffer time information. Therefore, by preferentially transmitting the data to the priority apparatus, the band can be dynamically distributed between the plurality of client apparatuses. With this, the client apparatuses can smoothly reproduce the data transmitted by progressive download. In this case, the information processing apparatus may be a relay node such as an access point.

The control unit may be capable of controlling the communication unit to receive the data addressed to the plurality of client apparatuses, which is transmitted from the server and transmit the data addressed to the priority apparatus to the priority apparatus in preference to the data addressed to the client apparatuses other than the priority apparatus.

With this, the information processing apparatus can relay communication between the server and the plurality of client apparatuses and efficiently distribute the band for download and reproduction of the data in each client apparatus.

The control unit may be capable of controlling the communication unit to receive the buffer time information from the plurality of client apparatuses. Further, in this case, the control unit may be capable of determining the priority apparatus by comparing the received buffer time information.

With this, the information processing apparatus can determine the priority apparatus by receiving the buffer time information from each client apparatus.

The control unit may be capable of controlling the communication unit to receive, from the server, encoding rate information indicating an encoding rate of the data transmitted addressed to the plurality of client apparatuses. Further, in this case, the control unit may be capable of calculating the buffer time information of the plurality of client apparatuses based on the encoding rate information, a data amount of data transmitted to the plurality of client apparatuses, and an elapsed time between start of the transmission to a current time.

With this, only by receiving the encoding rate information of the data, the information processing apparatus can calculate the buffer time information of each client apparatus without communicating with the client apparatus.

The control unit may be capable of controlling the communication unit to receive, from the server, encoding rate information indicating an encoding rate of the data transmitted addressed to the plurality of client apparatuses. In this case, the control unit may be capable of setting, according to the encoding rate information, a band allocated to the client apparatuses other than the priority apparatus to be narrower and a band allocated to the priority apparatus to be wider. Further, in this case, the control unit may be capable of controlling the communication unit to transmit the data to the plurality of client apparatuses at a speed corresponding to the set band.

With this, the information processing apparatus can dynamically change, according to the buffer time information, the band allocated to each client apparatus such that the buffer amount of the priority apparatus is increased.

The information processing apparatus may further include a reproduction unit capable of buffering and reproducing data transmitted from the server. In this case, the control unit may be capable of controlling the communication unit to receive, from the server, encoding rate information indicating an encoding rate of the data transmitted addressed to the information processing apparatus and the plurality of client apparatuses and receive the buffer time information from the plurality of client apparatuses. Further, in this case, the control unit may be capable of determining the priority apparatus by comparing the received buffer time information. Further, in this case, the control unit may be capable of setting, according to the encoding rate information, a band allocated to the client apparatuses other than the priority apparatus to be narrower and a band allocated to the priority apparatus to be wider. Further, in this case, the control unit may be capable of controlling the communication unit to transmit, to the priority apparatus and the client apparatuses other than the priority apparatus, band information indicating the allocated band.

With this, although the information processing apparatus itself forms a part of the client apparatus, the information processing apparatus can, collect the buffer time information of the other client apparatuses, determine the priority apparatus based on it, allocate the band to each client apparatus such that the buffer amount of the priority apparatus is increased, and notify each client apparatus of it. With this, by each client apparatus receiving the data at a speed corresponding to the band which the client apparatus is notified of, the buffer amount of the priority apparatus is increased.

An information processing method according to another embodiment of the present technology includes: regularly obtaining buffer time information indicating a buffer time that expresses an amount of data, which is buffered by the plurality of client apparatuses over the same network that are capable of buffering and reproducing data transmitted from a server by progressive download, using a time necessary for reproduction of the data; and determining a client apparatus whose buffer time is minimum among the plurality of client apparatuses as a priority apparatus to which the data should be preferentially transmitted.

A program according to still another embodiment of the present technology causes an information processing apparatus to execute an acquisition step and a determination step. In the acquisition step, buffer time information indicating a buffer time that expresses an amount of data, which is buffered by the plurality of client apparatuses over the same network that are capable of buffering and reproducing data transmitted from a server by progressive download, using a time necessary for reproduction of the data, is regularly obtained. In the determination step, a client apparatus whose buffer time is minimum among the plurality of client apparatuses is determined as a priority apparatus to which the data should be preferentially transmitted.

Effect of the Invention

As described above, according to the present technology, by dynamically distributing the band among the plurality of terminals, it is possible to smoothly reproduce the data transmitted by progressive download.

MODE(S) FOR CARRYING OUT THE INVENTION

Hereinafter, embodiments according to the present technology will be described with reference to the drawings.

First Embodiment

First, a first embodiment of the present technology will be described.

[Network Configuration of System]

Figure 1:
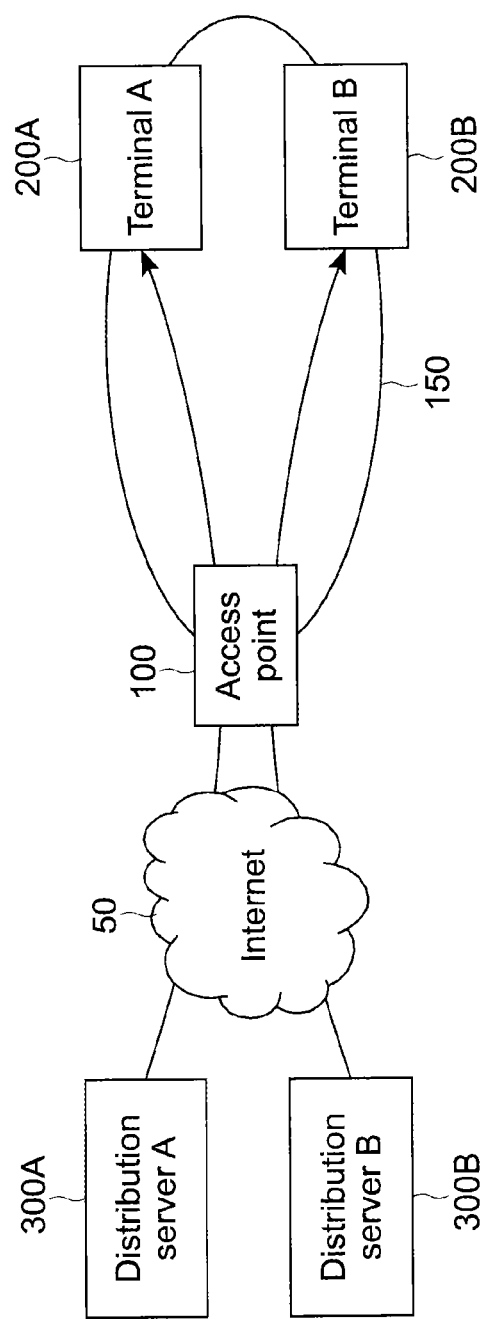
FIG. 1 A diagram showing a network configuration of a system in a first embodiment of the present technology.

FIG. 1 is a diagram showing a network configuration of a system according to this embodiment.

As shown in the figure, this system includes a distribution server 300, an access point 100, and a terminal 200. A plurality of distribution servers 300 can be present. In the figure, two distribution servers 300A and 300B are shown. However, three or more distribution servers 300 may be present. Further, a plurality of terminals 200 can be present for one access point 100. In the figure, two terminals 200A and 200B are shown. However, three or more terminals 200 may be connected to one access point 100.

Although the distribution servers 300 are provided on the Internet 50, for example, and distributes moving image data to the terminals 200. The moving image data is transmitted by progressive download. An encoding rate of the moving image data may differ depending on the distribution servers 300, the type of the moving image data, or the like.

The terminals 200 are connected to a wireless LAN 150 and the Internet 50 through the access point 100. The terminals 200 receive the moving image data from the distribution servers 300 through the access point 100 by progressive download, and buffer and reproduce it.

The terminal 200 can be any information processing apparatus, for example, a smartphone, a cellular phone, a tablet PC (Personal Computer), a desktop PC, a laptop PC, a TV, a PDA (Personal Digital Assistant), a portable AV player, an electronic book, a digital still camera, a camcorder, a television set, a PVR (Personal Video Recorder), a game console, a projector, or a car navigation system.

The access point 100 receives moving image data addressed to a plurality of different terminals 200 from the distribution servers 300 via the Internet 50 and transmits it to each of terminals 200 as destinations thereof under the control of the wireless LAN 150.

The access point 100 is an information processing apparatus having a function as a router. Although will be described in detail later, the access point 100 in this embodiment has, in order to efficiently use the band of the wireless LAN 150, a function of assigning priority for packets of moving image data to be transmitted to each terminal 200 under the control and controlling the buffer amount of the moving image data in each terminal 200.

[Hardware Configuration of Access Point]

Figure 2:
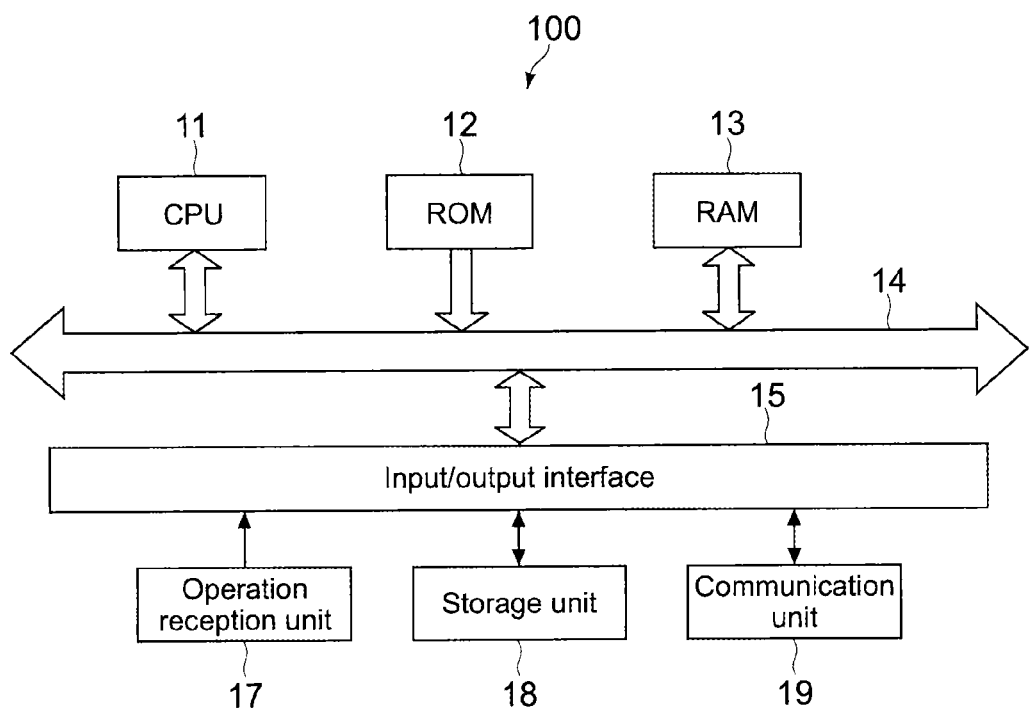
FIG. 2 A block diagram showing a hardware configuration of an access point in the system.

FIG. 2 is a diagram showing a hardware configuration of the access point 100. As shown in the figure, the access point 100 includes a CPU (Central Processing Unit) 11, a ROM (Read Only Memory) 12, a RAM (Random Access Memory) 13, an input/output interface 15, and a bus 14 that connects them to one another.

The CPU 11 comprehensively controls all blocks of the access point 100 while appropriately accessing the RAM 13 or the like if necessary and performing various types of arithmetic processing. In this embodiment, the CPU 11 performs, for example, reception processing of the moving image data from the distribution servers 300 and transmission processing to each terminal 200 (including control processing of buffer amount).

The ROM 12 is a non-volatile memory in which an OS executed by the CPU 11, a program, firmware such as various parameters are fixedly stored. The RAM 13 is used for a working area of the CPU 11 or the like and temporarily retains the OS, various programs being executed, and various types of data being processed.

To the input/output interface 15, connected are an operation reception unit 17, a storage unit 18, a communication unit 19, or the like.

The operation reception unit 17 is, for example, a push button. However, it may be another input apparatus such as a touch panel.

The storage unit 18 is, for example, a non-volatile memory such as an HDD (Hard Disk Drive), a flash memory (SSD; Solid State Drive), and another solid-state memory. In the storage unit 18, the OS, various applications, and various types of data are stored. In particular, in this embodiment, the storage unit 18 stores a program for controlling the buffer amount of the moving image data in each terminal 200, a database therefor, and the like.

The communication unit 19 includes an NIC for connecting to the Internet 50 and a wireless communication module for constructing the wireless LAN 150. Although not shown, the access point 100 also includes an antenna for communication by the wireless LAN.

[Hardware Configuration of Terminal]

Figure 3:
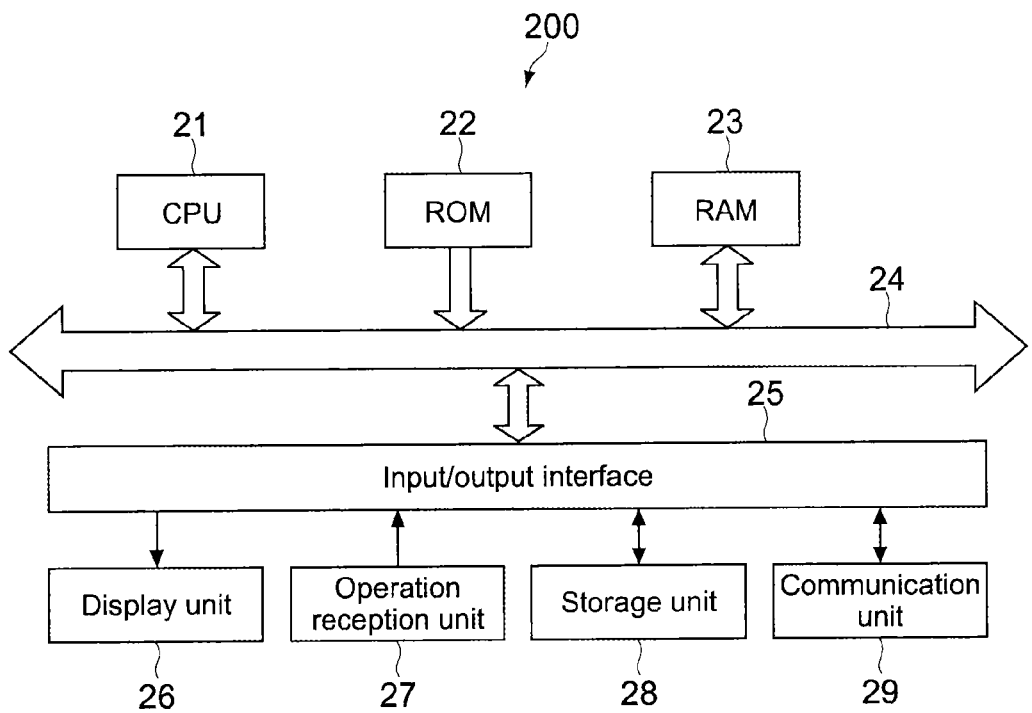
FIG. 3 A block diagram showing a hardware configuration of a terminal in the system.

FIG. 3 is a diagram showing a hardware configuration of the terminal 200. As shown in the figure, the terminal 200 includes a CPU 21, a ROM 22, a RAM 23, an input/output interface 25, and a bus 24 that connects them to one another.

The CPU 21 comprehensively controls all blocks of the terminal 200 while appropriately accessing the RAM 23 or the like if necessary and performing various types of arithmetic processing. In this embodiment, the CPU 21 performs, for example, download and reception processing of the moving image data, and calculation processing of a buffer time and notification processing of the buffer time to the access point 100 which will be described later.

The functions of the ROM 22 and the RAM 23 are the same as the functions of the ROM 12 and the RAM 13 of the access point 100 and hence descriptions thereof will be omitted.

To the input/output interface 25, connected are a display unit 26, an operation reception unit 27, a storage unit 28, a communication unit 29, and the like.

The display unit 26 is a display device using, for example, a LCD (Liquid Crystal Display), an OELD (Organic Electro Luminescence Display), or a CRT (Cathode Ray Tube). Some terminals 200 do not include a built-in display unit 26 and are connected to an external display apparatus. The display unit 26 displays moving image data downloaded from the distribution servers 300 via the access point 100 and reproduced.

The operation reception unit 27 is, for example, a pointing device such as a mouse, a keyboard, a button, a touch panel, or another input apparatus. If the operation reception unit 27 is a touch panel, the touch panel can be integrated with the display unit 26.

The storage unit 28 is, for example, a non-volatile memory such as an HDD (Hard Disk Drive), a flash memory (SSD; Solid State Drive), and another solid-state memory. The storage unit 28 stores an OS, various applications, and various types of data. In particular, in this embodiment, the storage unit 28 also functions as a cash of moving image data downloaded by progressive download.

Although the communication unit 19 is a wireless communication module for connecting to the wireless LAN 150 or the like, it may include an NIC or the like for wired Internet 50 connection.

[Module Configuration of Server, Access Point, and Terminal]

Figures 4, 5:
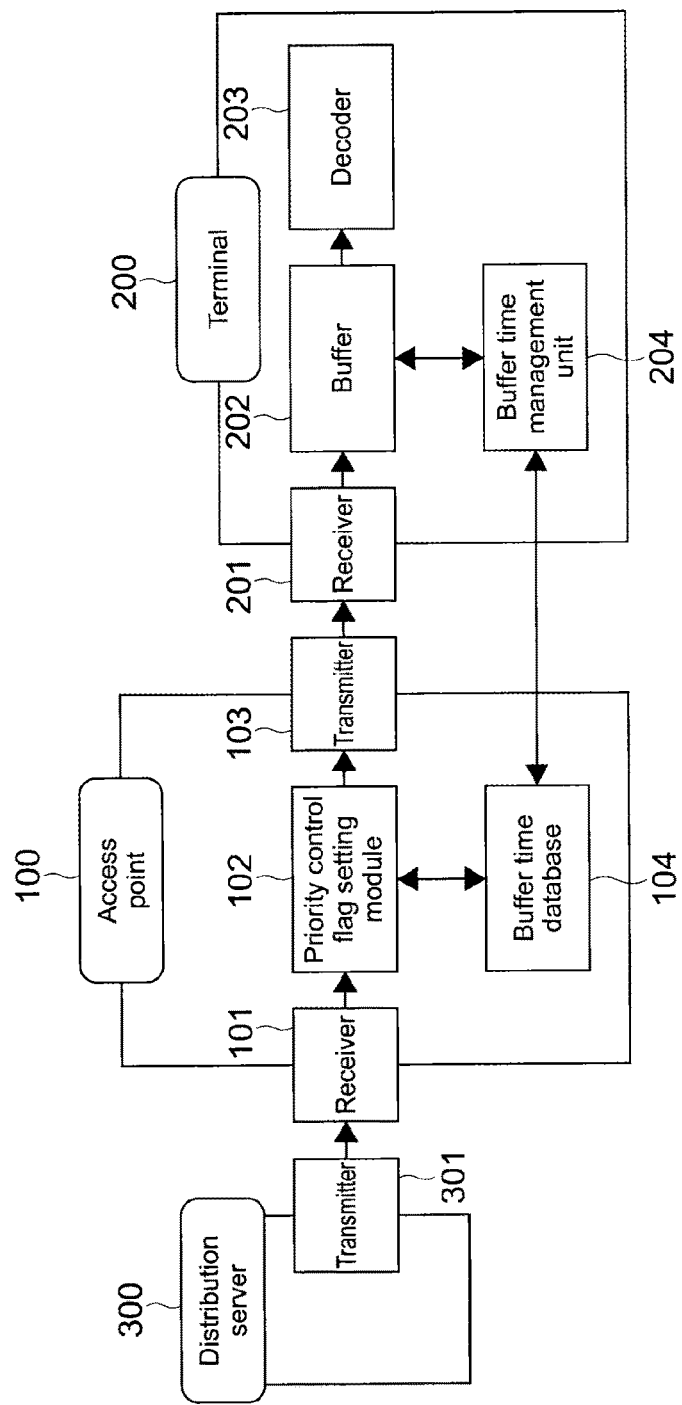
FIG. 4 A block diagram showing a configuration of software modules and a database of a server, an access point, and a terminal in the system.
FIG. 5 A diagram showing a configuration of a buffer time database of the access point.

FIG. 4 is a diagram showing a configuration of software modules and a database of the access point 100, the terminals 200, and the distribution servers 300.

As shown in the figure, the distribution server 300 includes a transmitter 301 as a software module.

The transmitter 301 transmits, in response to a request from the terminal 200, moving image data encoded at a predetermined encoding rate by progressive download.

The access point 100 includes software modules of a receiver 101, a priority control flag setting module 102, and a transmitter 103 and a buffer time database 104.

The receiver 101 receives moving image data (packet) addressed to each terminal 200 from the distribution server 300.

The priority control flag setting module 102 receives the packet from the receiver 101. The priority control flag setting module 102 determines the terminal to which the packet should be preferentially transmitted as the priority terminal. The priority control flag setting module 102 sets a priority flag to the packet addressed to the priority terminal. The priority control flag setting module 102 transmits it to the transmitter 103.

In this embodiment, a conception of a "buffer time" is used in the priority terminal determination processing. The buffer time is one that expresses an amount of moving image data accumulated in a buffer of each terminal 200 using not a data size but a time necessary for reproduction of the data.

The priority control flag setting module 102 regularly receives, from each terminal 200 that has started to receive the moving image data, buffer time information indicating the buffer time. Then, the priority control flag setting module 102 compares the buffer time information received from the terminals 200. The priority control flag setting module 102 determines the terminal 200 whose buffer time is minimum, that is, the terminal 200 whose buffer is most scarce (underfloor can occur) as the priority terminal. The priority control flag setting module 102 sets the priority flag to the packet addressed to the priority terminal.

The buffer amount in each terminal 200 is expressed as the buffer time and hence the priority control flag setting module 102 can compare buffer amounts of moving image data items at different encoding rates by using the same measure.

The buffer time database 104 stores the buffer time information received from each terminal 200 together with data relating to each terminal 200.

Based on the priority flag set by the priority control flag setting module 102, the transmitter 103 transmits the packet of the moving image data to each terminal 200.

The terminal 200 includes software modules of a receiver 201, a buffer 202, a decoder 203, and a buffer time management unit 204.

The receiver 201 receives the packet of the moving image data transmitted from the transmitter 103 of the access point 100 and transmits it to the buffer 202.

The buffer 202 temporarily accumulates the received moving image data. If a predetermined amount of data is accumulated, the buffer 202 outputs the data to the decoder 203.

The decoder 203 decodes data output from the buffer 202 and outputs it to the display unit 26 for reproducing it.

The buffer time management unit 204 regularly calculates a buffer time based on a size of data accumulated in the buffer 202 and an encoding rate of moving image data of which the buffer time management unit 204 is notified by the distribution server 300 in advance. The buffer time management unit 204 notifies the access point 100 of if.

[Configuration of Buffer Time Database]

FIG. 5 is a view showing a configuration of the buffer time database 104 of the access point 100.

As shown in the figure, the buffer time database 104 is constituted of a stream ID for identifying moving image data transmitted from the distribution server 300 to each terminal 200, an UP address and a port number of each terminal 200, and a buffer time of the buffer in each terminal 200. In the case where the difference in encoding rate between moving image data items is caused by the different distribution servers 300 as distribution sources thereof, the stream ID also has a function as an ID of the distribution server 300.

[Operation of System]

Next, operations of the access point 100 and the terminal 200 in the thus configured system will be described. In this embodiment and other embodiments, the operations of the access point 100 and the terminal 200 are performed by cooperation of the CPUs 11 and 21 thereof and the software modules executed under the control thereof.

[Operation of Access Point]

Figure 6:
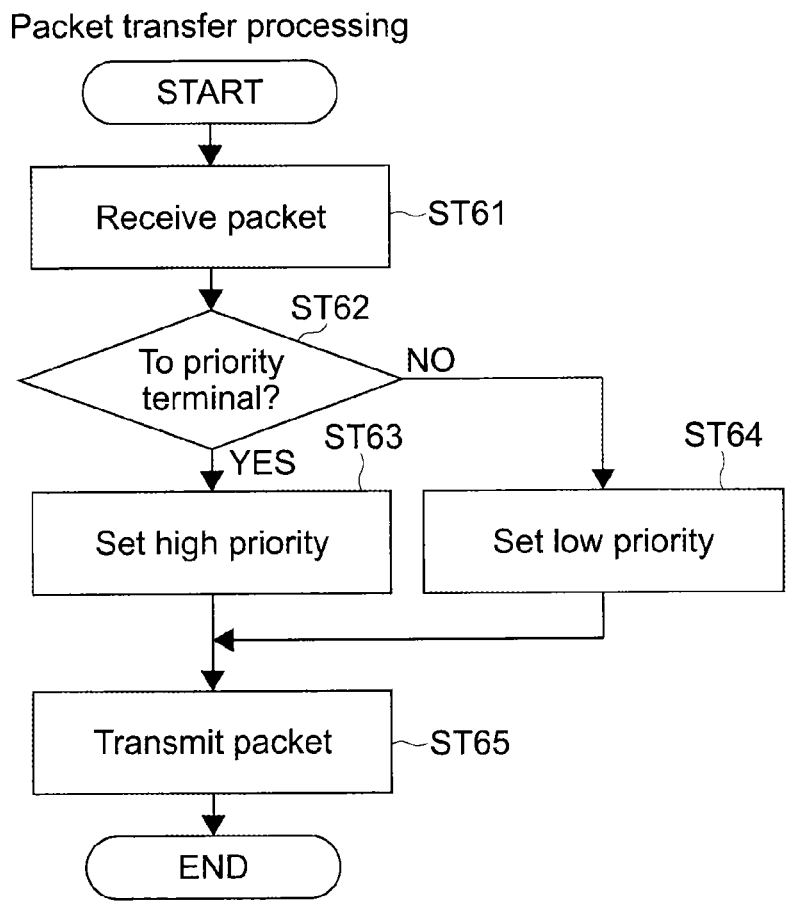
FIG. 6 A flowchart showing a flow of packet transfer processing to each terminal by the access point.
Figure 7:
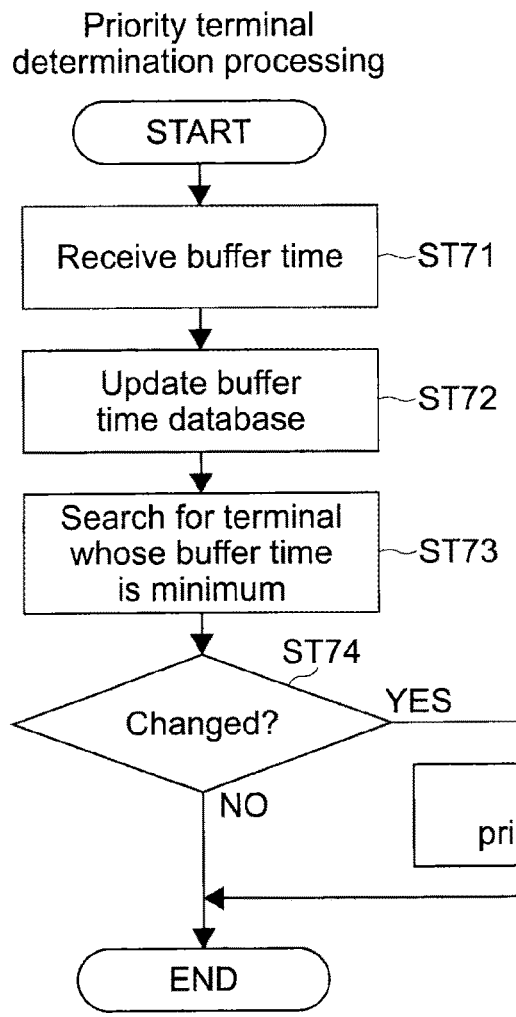
FIG. 7 A flowchart showing a flow of priority terminal determination processing based on a buffer time by the access point.

First, the operation of the access point 100 will be described. FIG. 6 is a flowchart showing a flow of packet transfer processing to each terminal 200 by the access point 100. Further, FIG. 7 is a flowchart showing a flow of priority terminal determination processing based on the buffer time by the access point 100. These two processes are performed in parallel.

[Packet Transfer Processing]

As shown in FIG. 6, first, the receiver 101 of the access point 100 receives, from the distribution server 300, a packet of moving image data addressed to any terminal 200 under the control (Step 61).

Subsequently, the priority control flag setting module 102 judges whether or not the received packet is addressed to the priority terminal (Step 62).

If it is judged that the packet is addressed to the priority terminal (Yes), the priority control flag setting module 102 sets ON of the priority flag to the packet and transmits this packet to the transmitter 103 (Step 63).

If it is judged that the packet is not addressed to the priority terminal (No), the priority control flag setting module 102 sets OFF of the priority flag to the packet and transmits this packet to the transmitter 103 (Step 64).

Then, the transmitter 103 transmits the packet to the terminal 200 as a destination thereof according to the setting of the priority flag (Step 65).

Here, for example, IEEE802.11e is used for the setting of the priority flag. The packet to which the priority flag of IEEE802.11e has been set is preferentially transmitted without being discarded even if a transfer rate of the packet reaches an upper limit of the band in the wireless LAN 150.

Instead of IEEE802.11e, a priority may be set in IP Precedence of a ToS (Type of Service) field in an IP header of a packet. Alternatively, a DSCP (DiffSery Code Point) in which the ToS field is re-defined as a DS (DiffServ) field may be used. In these cases, the same preferential transmission processing as that in the case of using the IEEE802.11e is realized.

The priority setting method is not limited to those described above and various methods can be used.

(Priority Terminal Determination Processing)

As shown in FIG. 7, first, the priority control flag setting module 102 of the access point 100 receives the buffer time information from each terminal 200 (Step 71).

Subsequently, the priority control flag setting module 102 updates the buffer time database 104 based on the received buffer time information (Step 72).

Subsequently, the priority control flag setting module 102 searches the buffer time database 104 for the terminal 200 whose buffer time is minimum by comparing the buffer time information items (Step 73).

Then, the priority control flag setting module 102 judges whether or not the terminal 200 whose buffer time is minimum is the terminal 200 different from that in the previous search (Step 74). If it is the different terminal 200, the terminal 200 is determined as a new priority terminal (Step 75).

If the priority terminal is determined for the first time after any terminal 200 starts to download the moving image data, in processing of from Steps 74 to 75, the terminal 200 whose buffer time is minimum is determined as the priority terminal as it is.

The priority control flag setting module 102 performs the above-mentioned processing every time when the buffer time information is regularly received from each terminal 200.

[Operation of Terminal]

Figure 8:
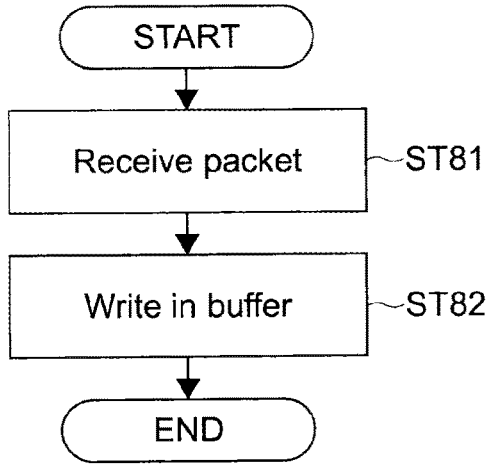
FIG. 8 A flowchart showing a flow of reception processing of a packet of moving image data by the terminal.
Figure 9:
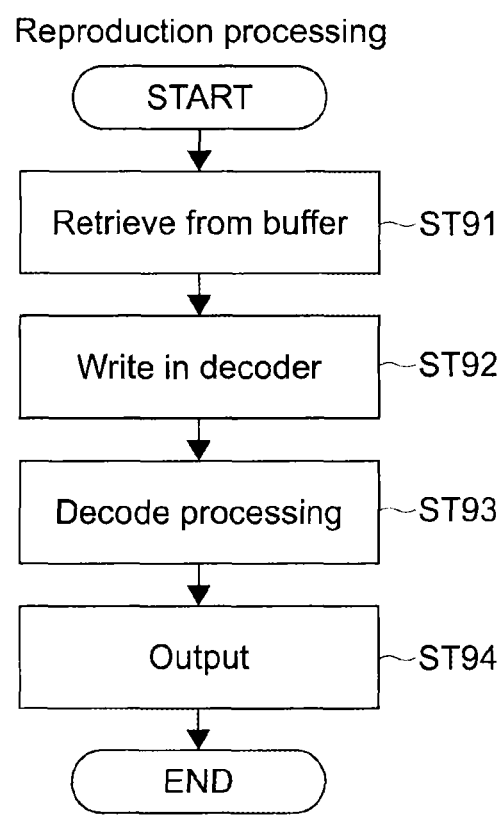
FIG. 9 A flowchart showing a flow of reproduction processing of the moving image data by the terminal.
Figure 10:
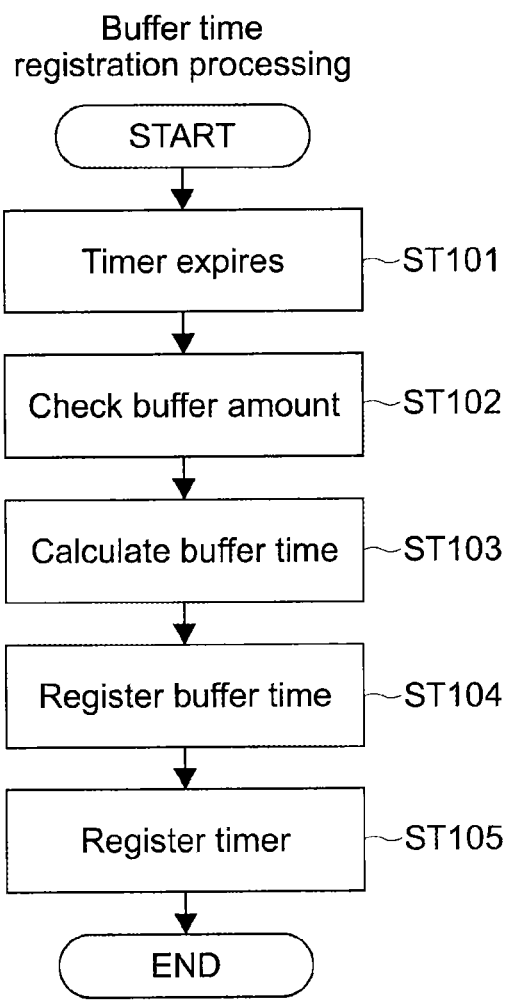
FIG. 10 A flowchart showing a flow of buffer time registration processing by the terminal.

Next, the operation of the terminal 200 will be described. FIG. 8 is a flowchart showing a flow of packet reception processing of the moving image data by the terminal 200. Further, FIG. 9 is a flowchart showing a flow of the reproduction processing of the moving image data by the terminal 200. Further, FIG. 10 is a flowchart showing a flow of buffer time registration processing by the terminal 200. These three processes are performed in parallel.

(Packet Reception Processing)

As shown in FIG. 8, when receiving the packet of the moving image data from the access point 100 (Step 81), the receiver 201 of the terminal 200 writes the data in the buffer 202 (Step 82).

(Reproduction Processing)

As shown in FIG. 9, if an accumulation amount of data in the buffer 202 reaches a predetermined amount, the decoder 203 of the terminal 200 retrieves the data from the buffer 202 (Step 91).

Subsequently, the decoder 203 writes the retrieved data (Step 92), decodes the data (Step 93), and outputs it to the display unit 26 (Step 94).

(Buffer Time Registration Processing)

As shown in FIG. 10, first, the buffer time management unit 204 of the terminal 200 detects that the timer set at predetermined time intervals expires (Step 101).

Subsequently, the buffer time management unit 204 checks the data accumulation amount of the buffer 202 at this time (Step 102).

Subsequently, the buffer time management unit 204 calculates a buffer time based on the data amount of the buffer 202 and the encoding rate of the moving image data currently received (Step 103). Specifically, the buffer time management unit 204 calculates a value obtained by dividing the data amount by the encoding rate as the buffer time.

Subsequently, the buffer time management unit 204 registers (transmits) the buffer time information indicating the calculated buffer time to the access point 100 (Step 104).

Then, the buffer time management unit 204 sets a timer for the next buffer time registration processing (Step 105).

The buffer time management unit 204 repeats the above-mentioned processing every time when the timer expires.

[Reproduction Processing Realized in This Embodiment and Effects Thereof]

Hereinafter, effects of reproduction processing realized in this embodiment will be described in comparison with the conventional technique.

Figure 11:
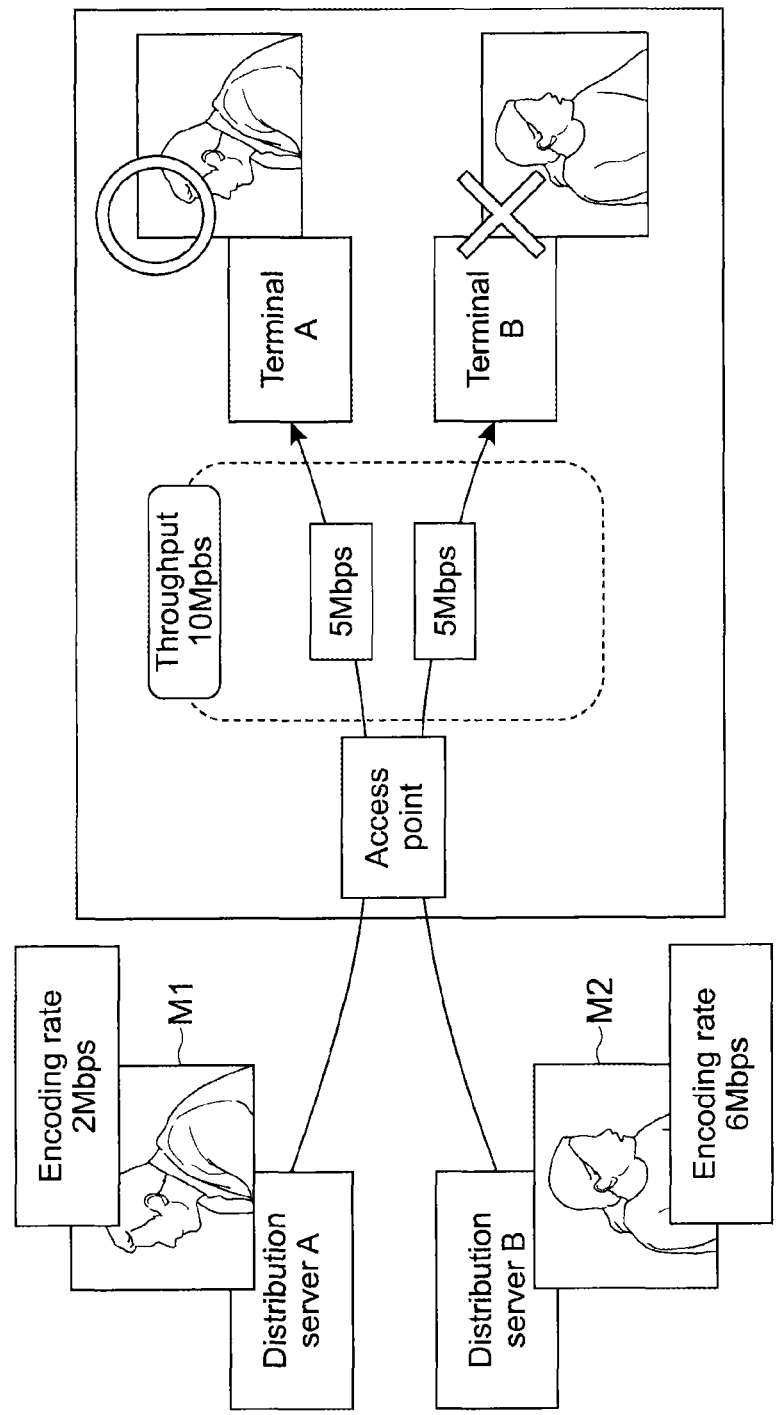
FIG. 11 A diagram showing an outline of reproduction processing of moving image data in a conventional network environment.
Figure 12:
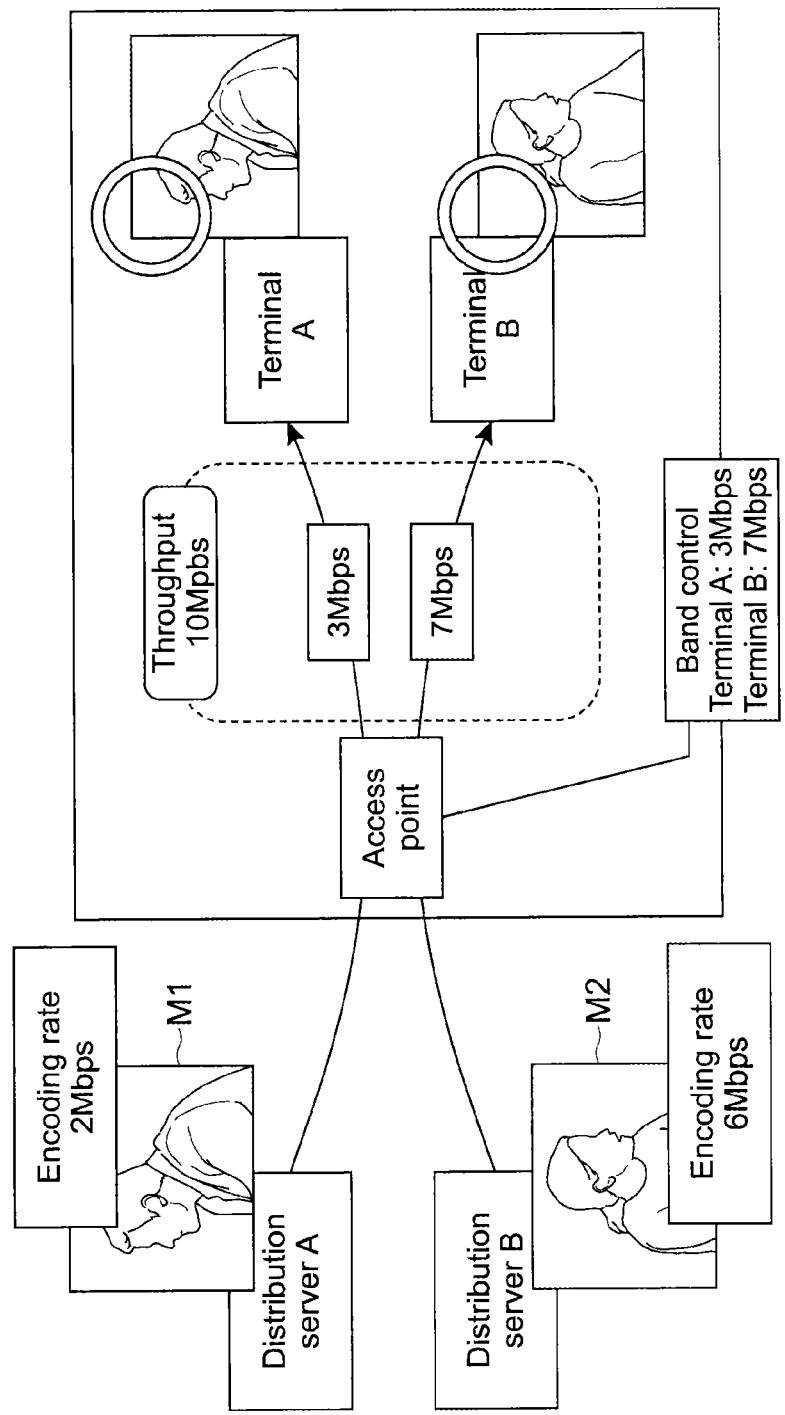
FIG. 12 A diagram showing an outline of reproduction processing of the moving image data in the conventional network environment.
Figure 13:
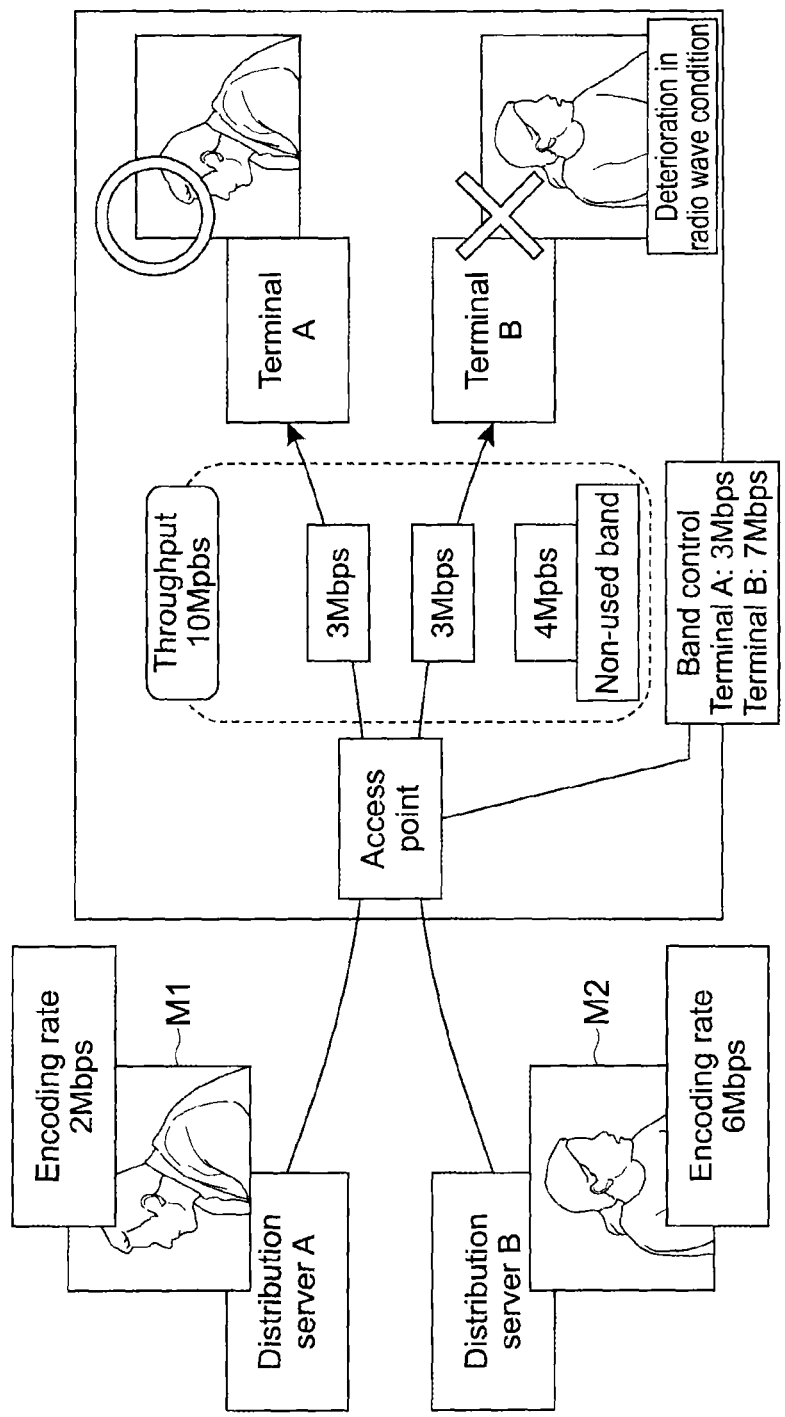
FIG. 13 A diagram showing an outline of reproduction processing of the moving image data in the conventional network environment.

FIGS. 11, 12, and 13 are diagrams schematically showing reproduction processing of moving image data in the conventional network environment.

Any of these network environments is, as in this embodiment, constructed by the Internet and the wireless LAN. Two terminals (terminal A, terminal B) receive moving image data items each transmitted by progressive download from different distribution servers (distribution server A, distribution server B) via the access point and reproduce them.

It is assumed that an encoding rate of moving image data M1 received from the distribution server A and reproduced by the terminal A is 2 Mbps and an encoding rate of moving image data M2 received from the distribution server B and reproduced by the terminal B is 6 Mbps. It is also assumed that, in any network environments, an effective throughput of the moving image data is 10 Mbps.

In the network environment shown in FIG. the moving image data is transmitted by progressive download and hence each terminal uses 5 Mbps of 10 Mbps that is the effective throughput.

In the terminal A, the throughput thereof is larger than the encoding rate of the moving image data M1. Therefore, the moving image data M1 is continuously accumulated in the buffer and the data is reproduced without interruption. On the other hand, in the terminal B, the throughput thereof is smaller than the encoding rate of the moving image data M2. Therefore, underfloor occurs in the buffer and reproduction of the moving image data is interrupted in the middle.

The sum of the encoding rates of the two moving image data items M1 and M2 is 2+6=8 Mbps. Therefore, if the band is suitably allocated, any terminal should be able to reproduce moving image data without interruption. In view of this, in the conventional technique, as shown in FIG. 12, a static band control is used. In the case where this static band control is used, any terminal can reproduce the moving image data without interruption by, for example, allocating 3 Mbps to the terminal A and 7 Mbps to the terminal B as the band.

However, in the static band control shown in FIG. 12, the upper limit of the band that can be used by each terminal is fixed and hence it lacks flexibility and a situation in which the band cannot be efficiently used in the wireless LAN environment occurs. Such a situation is shown in FIG. 13.

For example, a radio wave condition of the terminal B is deteriorated and the throughput drops to 3 Mpbs. Then, the band of 7−3=4 Mbps becomes available. However, if the static band control is set as described above, the terminal A cannot increase a buffer accumulation amount using the available band.

Further, even if the radio wave condition of the terminal B is restored, the terminal B cannot restore the buffer accumulation amount reduced when the throughput is lowered due to the deterioration of the reception condition.

Figure 14:
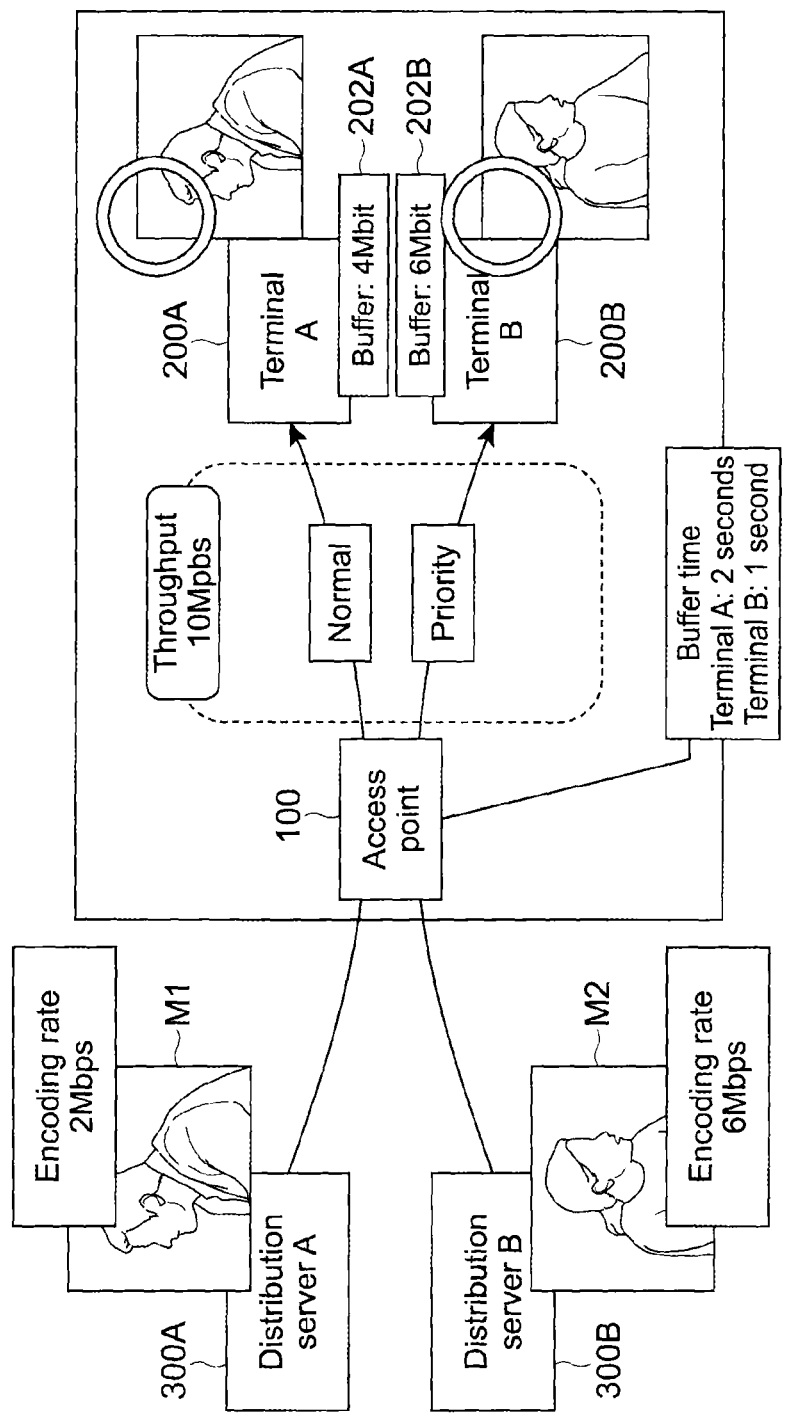
FIG. 14 A diagram showing an outline of reproduction processing of moving image data in the first embodiment of the present technology.

FIG. 14 is a diagram schematically showing reproduction processing of moving image data realized in this embodiment in comparison with the conventional network environment.

As shown in the figure, in this embodiment, in order to more flexibly allocate the band, as described above, the access point 100 and each terminal 200 handle the data accumulation amount in the buffer 202 of each terminal 200 as the buffer time. With this, the access point 100 can compare the moving image data items M1 and M2 at different encoding rates by using the same measure and preferentially transfers the data to the terminal 200 whose buffer 202 is most scarce.

For example, data of 4 Mbits and data of 6 Mbits are accumulated in the buffer of the terminal 200A and the buffer of the terminal 200B, respectively. Further, as in FIGS. 11 to 13, it is assumed that the encoding rate of the moving image data received by the terminal 200A is 2 Mbps and the encoding rate of the moving image data received by the terminal 200B is 6 Mbps. In this case, the data size of the data accumulated in a buffer 202B of the terminal 200B is larger. However, comparing the buffer time, the buffer time of the data accumulated in a buffer 202A of the terminal 200A is 2 seconds and the buffer time of the data accumulated in the buffer of the terminal 200B is 1 second. Therefore, it can be said that the buffer of the terminal 200B is more scarce.

Thus, the access point 100 determines the terminal 200B as the priority terminal and sets a priority flag to a packet to be transmitted to the terminal 200B. In this manner, the packet is preferentially transmitted to the terminal 200B. With this, the access point 100 can always optimize the use of the band of the wireless LAN 150 and at the same time cause all the terminals 200 under the control to reproduce the moving image data without interruption as possible.

Second Embodiment

Next, a second embodiment of the present technology will be described. In this embodiment and the following embodiments, the parts having the same functions as those in the first embodiment will be denoted by the same reference symbols and descriptions thereof will be omitted or simplified and points different from those in the first embodiment will be mainly described.

In the first embodiment, the access point 100 regularly obtains the buffer time information from each terminal 200. On the other hand, in this embodiment, the access point 100 calculates the buffer time of each terminal 200 by itself.

[Module Configuration of Server, Access Point, and Terminal]

Figure 15:
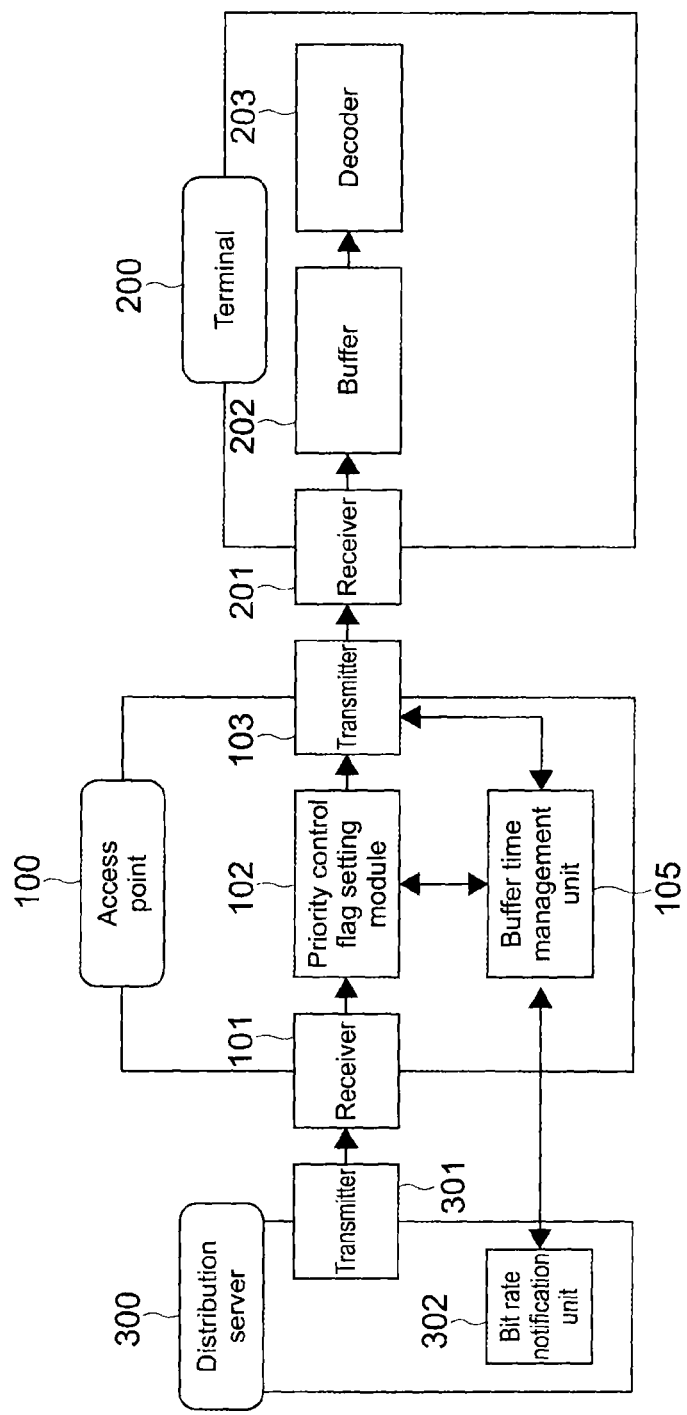
FIG. 15 A block diagram showing a configuration of software modules and a database of a server, an access point, and a terminal in a second embodiment of the present technology.

FIG. 15 is a block diagram showing a configuration of software modules and a database of a distribution server 300, the access point 100, and the terminal 200 in this embodiment.

As shown in the figure, in this embodiment, compared with the system shown in FIG. 4 as the first embodiment, the access point 100 includes a buffer time management unit 105 instead of the buffer time management unit 204 of the terminal 200.

Further, compared with the first embodiment, the distribution server 300 newly includes a bit rate notification unit 302.

From the distribution server 300, the buffer time management unit 105 of the access point 100 inquires a bit rate (encoding rate) of a packet of moving image data to be transmitted addressed to each terminal 200 and obtains bit rate information indicating this bit rate. Then, when a terminal 200 starts to download the moving image data, the buffer time management unit 105 calculates a buffer time of the terminal 200 based on a data size of a packet transmitted addressed to the terminal 200 and bit rate information of the moving image data. Although not shown in the figure, the buffer time management unit 105 includes a buffer time database similar to that shown in FIG. 5 as the first embodiment and the calculated buffer time is stored in the database.

In response to a request from the buffer time management unit 105, the bit rate notification unit 302 of the distribution server 300 notifies the access point 100 of the bit rate of the packet of the moving image data addressed to each terminal 200.

[Operation of System]

Figure 16:
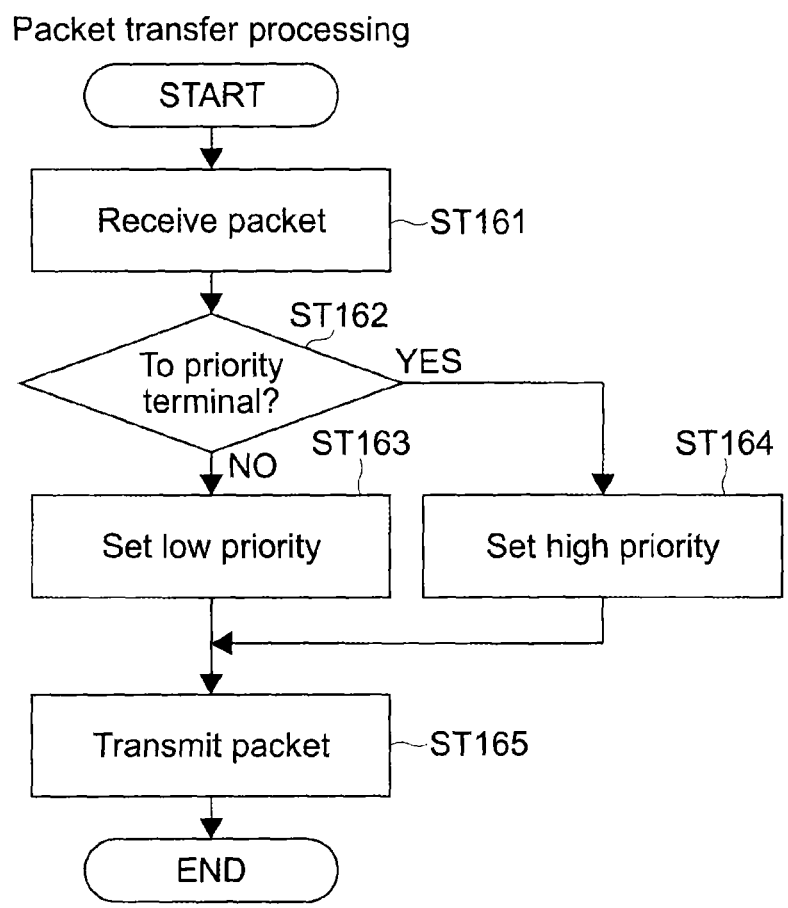
FIG. 16 A flowchart showing a flow of packet transfer processing to each terminal by the access point according to a second embodiment of the present technology.
Figure 17:
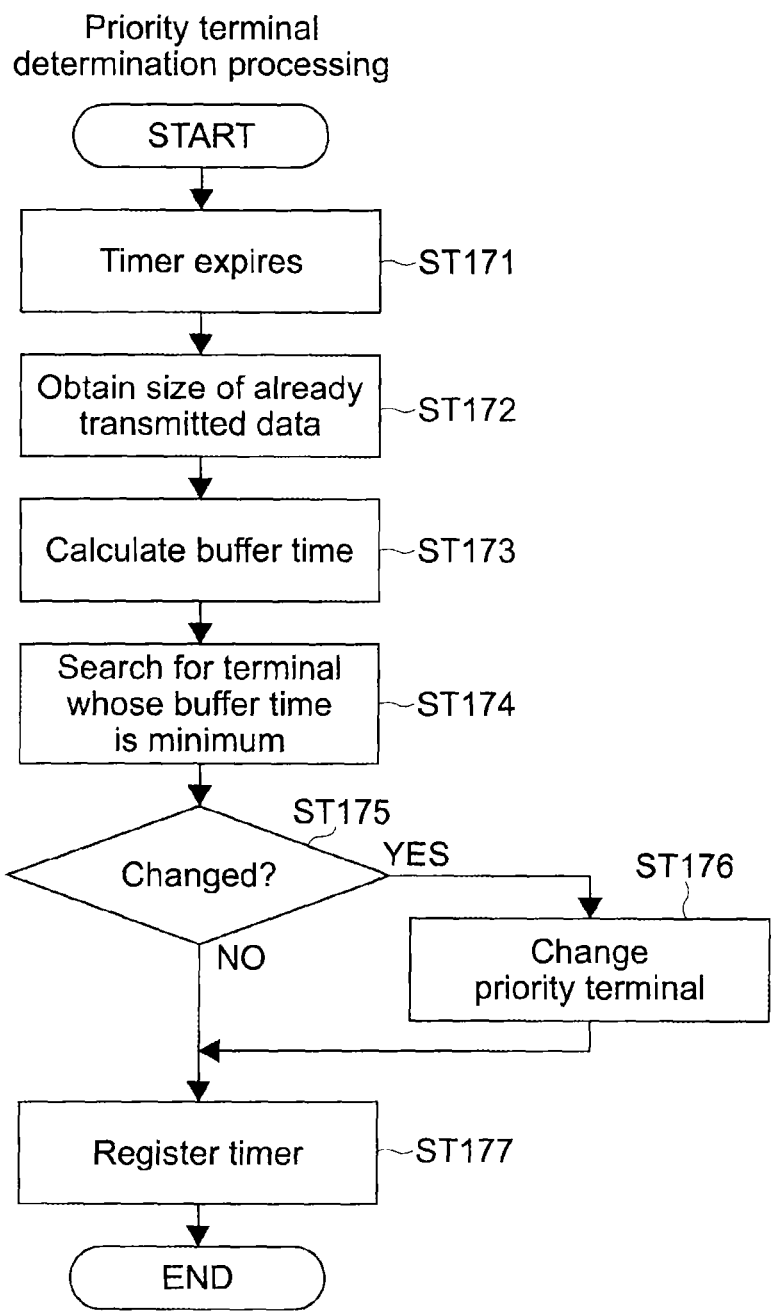
FIG. 17 A flowchart showing a flow of priority terminal determination processing based on a buffer time by the access point according to the second embodiment of the present technology.

Next, an operation of the access point 100 in this embodiment will be described. FIG. 16 is a flowchart showing a flow of packet transfer processing to each terminal 200 by the access point 100. Further, FIG. 17 is a flowchart showing a flow of determination processing of priority terminal determination processing based on the buffer time by the access point 100. These two processes are performed in parallel.

(Packet Transfer Processing)

As shown in FIG. 16, the flow (Steps 161 to 165) of the packet transfer processing of the access point 100 in this embodiment are similar to the flow (Step 61 to 65) of the packet transfer processing of the access point 100 described in FIG. 6 in the first embodiment (Steps 61 to 65). Thus, a description thereof will be omitted.

(Priority Terminal Determination Processing)

As a premise of the processing shown in FIG. 17, as described above, from the distribution server 300, the access point 100 inquires a bit rate of a packet of moving image data to be transmitted addressed to each terminal 200 and obtains bit rate information showing this bit rate.

As shown in FIG. 17, first, the buffer time management unit 105 of the access point 100 detects that a timer set at predetermined time intervals expires (Step 171).

Subsequently, the buffer time management unit 105 obtains, from the transmitter 103, a size of data received from the distribution server 300 and transmitted to each terminal 200 (Step 172).

Subsequently, the buffer time management unit 105 calculates the buffer time of each terminal 200 based on the bit rate of the data addressed to each terminal 200 that is obtained in advance, the obtained size of the already transmitted data, and an elapse time from a point of time when the transmission is started (point of time when the terminal 200 starts downloading) to a current time (Step 173).

Provided that the obtained size of the already transmitted data is D, the point of time when the terminal 200 starts downloading is T1, the current time is T2, and the bit rate is R, the buffer time is calculated in the following expression.

$$\frac{D - (R*(T2 - T1))}{R} \quad \text{[Formula 1]}$$

*Described below Fig. 17.

The information on the calculated buffer time is registered in the buffer time database.

Subsequently, the priority control flag setting module 102 searches the buffer time database for the terminal 200 whose buffer time is minimum by comparing the buffer time information items by cooperation with the buffer time management unit 105 (Step 174).

Subsequently, the priority control flag setting module 102 judges whether or not the terminal 200 whose buffer time is minimum is a terminal 200 different from that in the previous search (Step 175).

If the terminal whose buffer time is minimum is the different terminal 200, the priority control flag setting module determines the terminal 200 as a new priority terminal, sets the priority flag to the packet addressed to the priority terminal, and transmits it to the transmitter 103 (Step 176).

If the priority terminal is determined for the first time after any terminal 200 starts downloading of the moving image data, in processing of from Steps 175 to 176, the terminal 200 whose buffer time is minimum is determined as the priority terminal as it is.

Then, the priority control flag setting module 102 sets a timer for next priority terminal determination processing (Step 177).

The priority control flag setting module 102 repeats the above-mentioned processing every time when the timer expires.

In this manner, in this embodiment, the access point 100 receives, from the distribution server 300, the encoding rate of the moving image data addressed to the terminal 200. Thus, the access point 100 can calculate the buffer time of each terminal 200 by itself and determine the priority terminal.

Third Embodiment

Next, a third embodiment of the present technology will be described.

In the first and second embodiments, the access point 100 uses the priority control method, for example, IEEE802.11e or a ToS field in an IP header in order to preferentially transmit the packet to the priority terminal. However, in this embodiment, an access point 100 dynamically changes a band allocated for each terminal 200 in a wireless LAN 150 according to an encoding rate of moving image data addressed to each terminal 200, to thereby preferentially transmit a packet addressed to the priority terminal.

[Module Configuration of Server, Access Point, and Terminal]

Figures 18, 19:
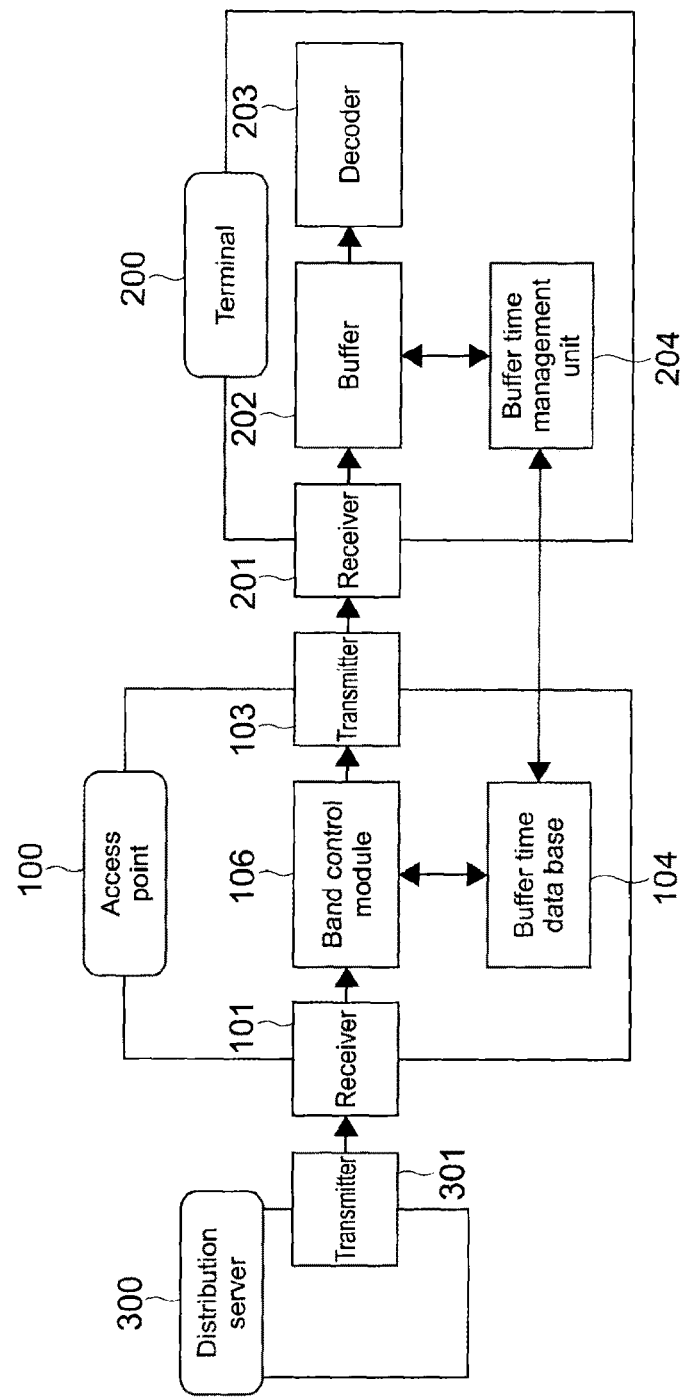
FIG. 18 A block diagram showing a configuration of software modules and a database of a server, an access point, and a terminal in a third embodiment of the present technology.
FIG. 19 A diagram showing a configuration of a buffer time database of the access point in the third embodiment of the present technology.

FIG. 18 is a block diagram showing a configuration of a software module and a database of a distribution server 300, the access point 100, and the terminal 20 in this embodiment.

As shown in the figure, in this embodiment, the access point 100 includes a band control module 106 instead of the priority control flag setting module 102 provided in the first and second embodiments.

A configuration of other modules of the access point 100, the terminal 200, and the distribution server 300 is similar to that in FIG. 4 in the first embodiment. However, instead of this configuration, a configuration in which the priority control flag setting module 102 in the configuration in FIG. 15 in the second embodiment is changed to the band control module 106 may be employed.

The band control module 106 obtains buffer time information from each terminal 200 and determines the priority apparatus by comparing them. The band control module 106 obtains, from the distribution server 300, an encoding rate of the moving image data addressed to each terminal. The band control module 106 narrows the band allocated to the terminals 200 other than the priority terminal according to the encoding rate. The band control module 106 controls the band to narrow the band allocated to the priority apparatus.

[Configuration of Buffer Time Database]

FIG. 19 is a diagram showing a configuration of the buffer time database 104 of the access point 100 in this embodiment.

As shown in the figure, in comparison with that described in FIG. 5 in the first embodiment, the encoding rate of the moving image data is added in the buffer time database 104 in this embodiment. This is because the encoding rate is necessary for calculating the band allocated to each terminal 200.

[Operation of System]

Figure 20:
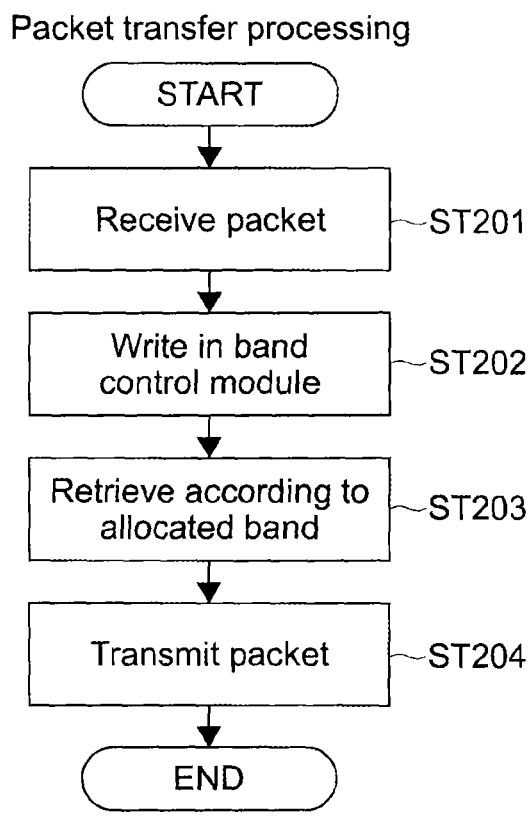
FIG. 20 A flowchart showing a flow of packet transfer processing to each terminal by the access point according to the third embodiment of the present technology.
Figure 21:
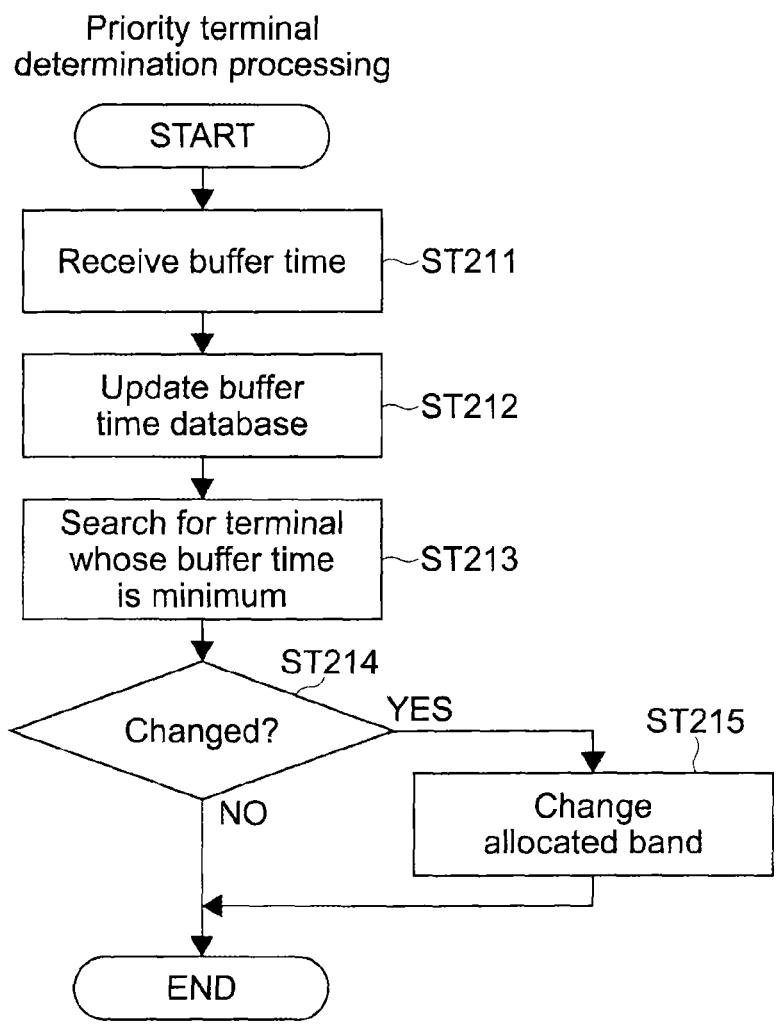
FIG. 21 A flowchart showing a flow of priority terminal determination processing based on a buffer time by the access point according to the third embodiment of the present technology.

Next, an operation of the access point 100 in this embodiment will be described. FIG. 20 is a flowchart showing a flow of the packet transfer processing to each terminal 200 by the access point 100. Further, FIG. 21 is a flowchart showing a flow of the priority terminal determination processing based on the buffer time by the access point 100. These two processes are performed in parallel.

(Packet Transfer Processing)

As shown in FIG. 20, first, a receiver 101 of the access point 100 receives, from the distribution server 300, a packet of moving image data addressed to any terminal 200 under the control (Step 201).

Subsequently, the band control module 106 writes the received data in its own buffer (Step 202).

Subsequently, the band control module 106 retrieves data addressed to each terminal 200 from the buffer according to the band allocated to each terminal 200 in priority terminal determination processing which will be described later (Step 203).

Then, the band control module 106 transmits the retrieved data to each terminal 200 at a speed corresponding to the band allocated to each terminal 200 by cooperation with the transmitter 103 (Step 204).

(Priority Terminal Determination Processing)

As shown in FIG. 21, when each terminal 200 starts to download the moving image data, the band control module 106 regularly receives the buffer time information from each terminal 200 (Step 211).

Subsequently, the band control module 106 updates the buffer time database 104 based on the received buffer time information (Step 212).

Subsequently, the band control module 106 searches the buffer time database 104 for the terminal 200 whose buffer time is minimum by comparing the buffer time information items (Step 213).

Then, the band control module 106 judges whether or not the terminal 200 whose buffer time is minimum is a terminal 200 different from that in the previous search (Step 214).

If the terminal 200 whose buffer time is minimum is the different terminal 200 (Yes), the band control module 106 determines the terminal 200 as a new priority terminal and newly calculates a band allocated to this priority terminal and the other terminals 200.

Specifically, the band control module 106 allocates, to the non-priority terminals, the band of 50% of the encoding rate of the moving image data received by the non-priority terminals and allocates a band that becomes available due to it to the priority terminal.

For example, a case where the encoding rate of the moving image data received by the priority terminal is 2 Mbps and the encoding rates of the moving image data items received by the two non-priority terminals are 4 Mbps and 1 Mbps, respectively, is assumed. In this case, the bands allocated to the non-priority terminals are 4*½=2 Mbps and 1*½=0.5 Mpbs, respectively. Thus, the band allocated to the priority terminal is 4.5 Mbps obtained by adding, to 2 Mbps of the encoding rate of the moving image data received by it, 2 Mbps and 0.5 Mpbs that becomes available due to the allocation of the bands to the non-priority terminals.

If the priority terminal is determined for the first time after any terminal 200 starts to download the moving image data, in the processing in Steps 214 to 215, the terminal 200 whose buffer time is minimum is determined as the priority terminal as it is.

The band control module 106 performs the above-mentioned processing every time when the buffer time information is regularly received from each terminal 200.

By the above-mentioned processing, in this embodiment, the access point 100 is capable of making a setting such that the bands to be allocated to the non-priority terminals are narrowed and the band to be allocated to the priority apparatus is widened, according to the buffer time of each terminal 200 and the encoding rate of the moving image data received by each terminal 200. Then, the access point 100 transmits the moving image data to each terminal 200 at a speed corresponding to the set band. Thus, the access point 100 can allocate the band according to a degree of scarcity of the buffer of each terminal 200 and realize reproduction in each terminal 200 without interruption.

Fourth Embodiment

Next, a fourth embodiment of the present technology will be described.

In the third embodiment, the access point 100 includes the band control module 106 such that the band is dynamically allocated to each terminal 200 according to the buffer time and the encoding rate. In this embodiment, the dynamic band control is realized not by an access point 100 but by mutual communication between a plurality of terminals 200.

[Module Configuration of Server, Access Point, and Terminal]

Figure 22:
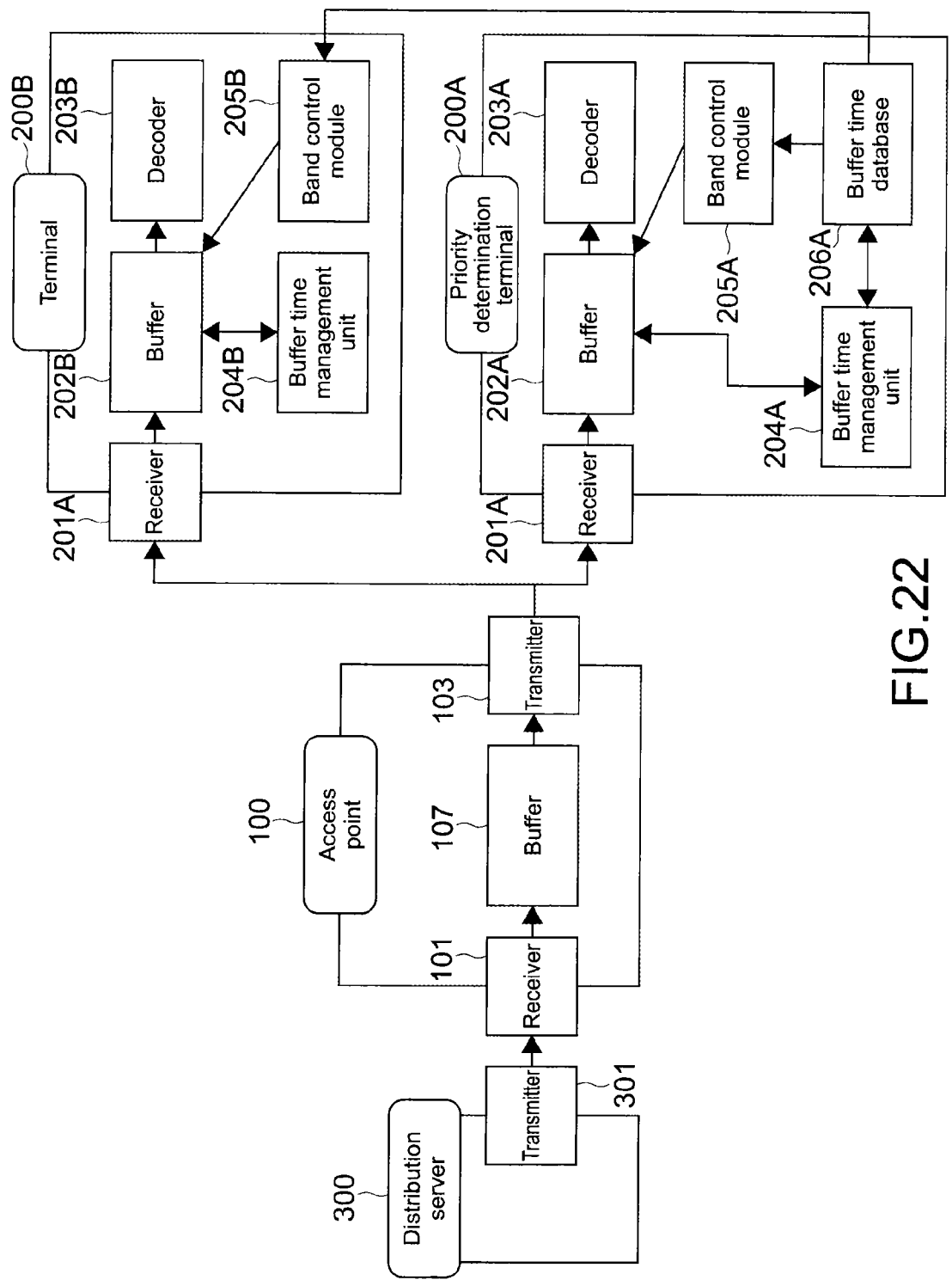
FIG. 22 A block diagram showing a configuration of software modules and a database of a server, an access point, and terminals in a fourth embodiment of the present technology.

FIG. 22 is a block diagram showing software modules and a database of a distribution server 300, the access point 100, and the terminals 200 in this embodiment.

As shown in the figure, in comparison with the diagram shown in FIG. 18 in the third embodiment, the band control module 106 of the access point 100 is omitted and replaced simply by a buffer 107 in this embodiment.

Instead of this, each of the terminals 200 includes a band control module 205 and a buffer time management unit 204. Further, a terminal (priority determination terminal) 200A responsible for priority determination processing out of the plurality of terminals 200 includes a buffer time database 206.

The buffer time management unit 204 of the priority determination terminal 200A receives buffer time information from the buffer time management unit 204 of the other terminal 200B and registers it in the buffer time database 206 together with the buffer time information.

Further, the band control module 205 of the priority determination terminal 200A determines the band allocated to each terminal 200 and notifies the other terminal 200B of it by the same method as that of the band control module 106 of the access point 100 in the third embodiment.

The band control module 205 of the terminal 200B notified downloads the moving image data at a speed corresponding to the allocated band. With this, dynamic band control processing similar to that in the third embodiment is consequently realized.

[Operation of System]

Next, operations of the terminals 200A and 200B in the thus configured system will be described.

Figure 23:
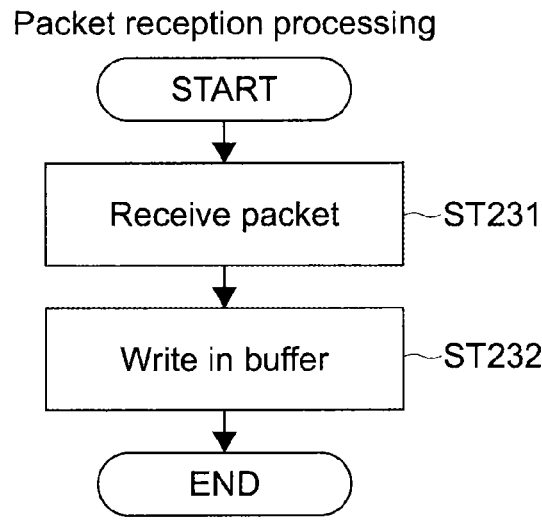
FIG. 23 A flowchart showing a flow of reception processing of a packet of moving image data by the terminal according to the fourth embodiment of the present technology.
Figure 24:
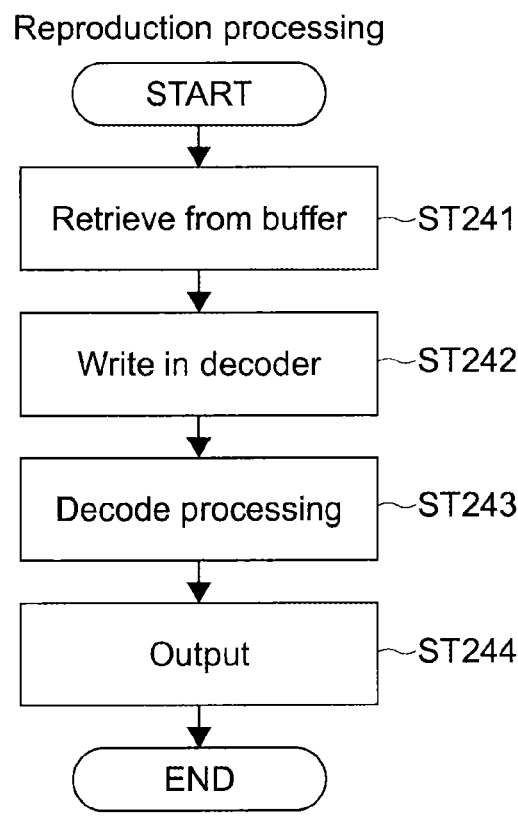
FIG. 24 A flowchart showing a flow of reproduction processing of the moving image data by the terminal according to the fourth embodiment of the present technology.
Figure 25:
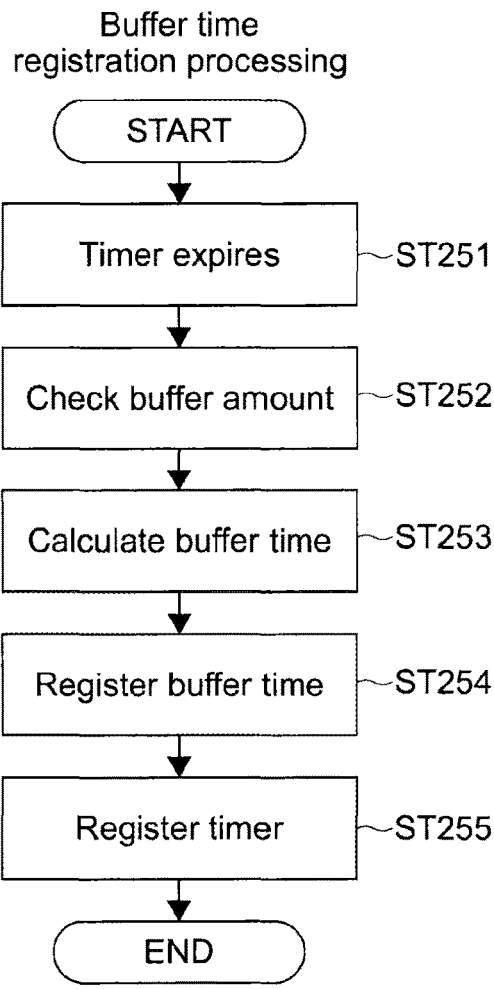
FIG. 25 A flowchart showing a flow of buffer time registration processing by the terminal according to the fourth embodiment of the present technology.
Figure 26:
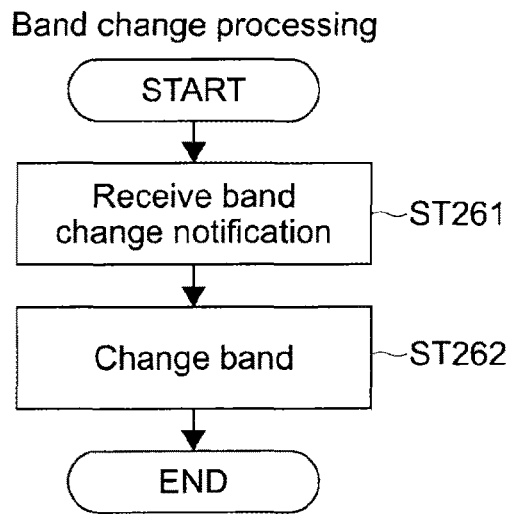
FIG. 26 A flowchart showing a flow of band change processing by the terminal according to the fourth embodiment of the present technology.

FIG. 23 is a flowchart showing a flow of packet reception processing in the terminal 200. FIG. 24 is a flowchart showing a flow of reproduction processing in the terminal 200. FIG. 25 is a flowchart showing a flow of buffer time registration processing in the terminal 200. FIG. 26 is a flowchart showing a flow of band change processing in the terminal 200. These processes are performed in parallel.

(Packet Reception Processing)

As shown in FIG. 23, the flow of the packet reception processing in the terminal 200 is similar to the flow (Steps 81, 82) of processing described using FIG. 8 in the first embodiment (Steps 231, 232). Thus, a description thereof will be omitted.

(Reproduction Processing)

As shown in FIG. 24, the flow of the reproduction processing in the terminal 200 is also similar to the flow (Steps 91 to 94) of the processing described using FIG. 9 in the first embodiment (Steps 241 to 244). Thus, a description thereof will be omitted.

(Buffer Time Registration Processing)

As shown in FIG. 25, the flow of the buffer time registration processing in the terminal 200 (non-priority determination terminal 200B) is also similar to the flow (Steps 101 to 105) of the processing using FIG. 10 in the first embodiment (Steps 251 to 255). Thus, a description thereof will be omitted. The priority determination terminal 200A receives buffer time information from the other terminal 200B and calculates a buffer time of its own buffer 202A by the same calculation method. The priority determination terminal 200A collectively registers them in a buffer time database 206A.

(Priority Terminal Determination Processing)

Although not shown in the figure, a band control module 205A of the priority determination terminal 200A determines the priority terminal based on the buffer time information received from each terminal 200B by the same method as that shown in FIG. 21 as the third embodiment, and determines the band allocated to each terminal 200. Further, the band control module 205A notifies each terminal 200B of information indicating the band allocated to each terminal 200B.

(Band Change Processing)

As shown in FIG. 26, a band control module 205B of the terminal 200B receives a notification of an allocated band (change) from the priority determination terminal 200A (Step 261).

Then, the band control module 205B changes the band setting for downloading the moving image data from the distribution server 300 via the access point 100 at a speed corresponding to the allocated band included in the notification (Step 262). This processing is repeated every time when the band change notification is received from the priority determination terminal 200A.

By the above-mentioned processing, in this embodiment, the priority determination terminal 200A can increase the buffer amount in the terminal 200 whose buffer time is short, by allocating the band to be used by each terminal 200 in the wireless LAN 150 by itself without performing the processing of the access point 100.

Modified Example

The present technology is not limited only to the above-mentioned embodiments and may be variously modified without departing from the gist of the present technology.

In the first to fourth embodiments, an example in which each terminal 200 receives and reproduces the moving image data by progressive download has been shown. However, data received and reproduced by the present technology is not limited to the moving image data and may be audio data, for example.

In the first to fourth embodiments, the distribution servers 300 are provided over the Internet 50. However, the distribution servers 300 may be provided over another network, for example, a LAN.

In the first to fourth embodiments, the description has been made assuming that the terminal 200 receives and reproduces the moving image data in a general user's home. However, the present technology can be applied also to a system for business use. For example, the present technology can also be applied to a system in which moving image content being produced at a broadcast station or the like is transmitted from a place (server) to another place (terminal).

[Others]

The present technology may also take the following configurations.

(1) An information processing apparatus, including:
a communication unit that is communicable with a plurality of client apparatuses over the same network that are capable of buffering and reproducing data transmitted from a server by progressive download; and
a control unit that is capable of regularly obtaining buffer time information indicating a buffer time that expresses an amount of data buffered by the plurality of client apparatuses using a time necessary for reproduction of the data and determining a client apparatus whose buffer time is minimum among the plurality of client apparatuses as a priority apparatus to which the data should be preferentially transmitted.

(2) The information processing apparatus according to (1), in which
the control unit is capable of controlling the communication unit to receive the data addressed to the plurality of client apparatuses, which is transmitted from the server and transmit the data addressed to the priority apparatus to the priority apparatus in preference to the data addressed to the client apparatuses other than the priority apparatus.

(3) The information processing apparatus according to (1) or (2), in which
the control unit is capable of
controlling the communication unit to receive the buffer time information from the plurality of client apparatuses and
determining the priority apparatus by comparing the received buffer time information.

(4) The information processing apparatus according to (1) or (2), in which
the control unit is capable of
controlling the communication unit to receive, from the server, encoding rate information indicating an encoding rate of the data transmitted addressed to the plurality of client apparatuses and
calculating the buffer time information of the plurality of client apparatuses based on the encoding rate information, a data amount of data transmitted to the plurality of client apparatuses, and an elapsed time between start of the transmission to a current time.

(5) The information processing apparatus according to (3), in which
the control unit is capable of
controlling the communication unit to receive, from the server, encoding rate information indicating an encoding rate of the data transmitted addressed to the plurality of client apparatuses,
setting, according to the encoding rate information, a band allocated to the client apparatuses other than the priority apparatus to be narrower and a band allocated to the priority apparatus to be wider, and
controlling the communication unit to transmit the data to the plurality of client apparatuses at a speed corresponding to the set band.

(6) The information processing apparatus according to (1), further including
a reproduction unit capable of buffering and reproducing data transmitted from the server,
the control unit is capable of
controlling the communication unit to receive, from the server, encoding rate information indicating an encoding rate of the data transmitted addressed to the information processing apparatus and the plurality of client apparatuses and receive the buffer time information from the plurality of client apparatuses,
determining the priority apparatus by comparing the received buffer time information,
setting, according to the encoding rate information, a band allocated to the client apparatuses other than the priority apparatus to be narrower and a band allocated to the priority apparatus to be wider, and controlling the communication unit to transmit, to the priority apparatus and the client apparatuses other than the priority apparatus, band information indicating the allocated band.

DESCRIPTION OF SYMBOLS

11, CPU
19, 29 communication unit
20 terminal
50 Internet
100 access point
101 receiver
102 priority control flag setting module
103 transmitter
104 buffer time database
105 buffer time management unit
106 band control module
107 buffer
150 wireless LAN
200 (200A, 200B) terminal
201 receiver
202 (202A, 202B) buffer
203 (203A, 203B) decoder
204 (204A, 204B) buffer time management unit
205 (205A, 205B) band control module
206 (206A, 206B) buffer time database
300 (300A, 300B) distribution server
301 transmitter
302 bit rate notification unit

The invention claimed is:

1. An information processing apparatus, comprising:
    circuitry; and
    a non-transitory memory storing computer-readable instructions that, when executed by the circuitry, control the circuitry to
        communicate with a plurality of client apparatuses over a same network, the client apparatuses being configured to buffer and reproduce data transmitted from a server by transmission and reception of Internet protocol (IP) packets; and
        regularly obtain communication status information from the plurality of client apparatuses, the communication status information including buffer status information;
        determine, from the regularly obtained communication status information that includes the buffer status information, which client apparatus among the plurality of client apparatuses is a priority apparatus to which the data is to be preferentially transmitted; and
        receive the data transmitted from the server and addressed to the plurality of client apparatuses, and transmit the data addressed to the priority apparatus to the priority apparatus in preference to the data addressed to client apparatuses other than the priority apparatus.

2. The information processing apparatus of claim 1, wherein the circuitry is controlled to receive encoding rate information indicating an encoding rate of the data transmitted to each of the plurality of client apparatuses.

3. The information processing apparatus of claim 2, wherein the data are transmitted from a plurality of servers having different encoding rates.

4. The information processing apparatus of claim 2, wherein the circuitry is controlled to allocate a band to each of the plurality of client apparatuses in accordance with the encoding rate information.

5. The information processing apparatus of claim 1, wherein the circuitry is controlled to allocate a band to each of the plurality of client apparatuses.

6. The information processing apparatus of claim 5, wherein the circuitry is controlled to allocate a larger band to the priority apparatus than the band allocated to any client apparatuses other than the priority apparatus.

7. An information processing method, comprising:
    communicating, by circuitry acting under control of computer-readable instructions stored in a non-transitory memory, with a plurality of client apparatuses over a same network, the client apparatuses being configured to buffer and reproduce data transmitted from a server by transmission and reception of Internet protocol (IP) packets;
    regularly obtaining, by the circuitry acting under control of the computer-readable instructions stored in the non-transitory memory, communication status information from the plurality of client apparatuses, the communication status information including buffer status information;
    determining, by the circuitry acting under control of the computer-readable instructions stored in the non-transitory memory, from the regularly obtained communication status information that includes the buffer status information, which client apparatus among the plurality of client apparatuses is a priority apparatus to which the data is to be preferentially transmitted; and
    receiving, by the circuitry acting under control of the computer-readable instructions stored in the non-transitory memory, the data transmitted from the server and addressed to the plurality of client apparatuses, and transmitting the data addressed to the priority apparatus to the priority apparatus in preference to the data addressed to client apparatuses other than the priority apparatus.

8. A non-transitory, computer-readable medium storing instructions that, when executed by circuitry of an information processing apparatus, control the circuitry to:
    communicate with a plurality of client apparatuses over a same network, the client apparatuses being configured to buffer and reproduce data transmitted from a server by transmission and reception of Internet protocol (IP) packets;
    regularly obtain communication status information from the plurality of client apparatuses, the communication status information including buffer status information;
    determine, from the regularly obtained communication status information that includes the buffer status information, which client apparatus among the plurality of client apparatuses is a priority apparatus to which the data is to be preferentially transmitted; and
    receive the data transmitted from the server and addressed to the plurality of client apparatuses, and transmit the data addressed to the priority apparatus to the priority apparatus in preference to the data addressed to client apparatuses other than the priority apparatus.

9. The method according to claim 7, further comprising:
    receiving, by the circuitry acting under control of the computer-readable instructions stored in the non-transitory memory, encoding rate information indicating an encoding rate of the data transmitted to each of the plurality of client apparatuses.

10. The method according to claim 9, wherein the data are transmitted from a plurality of servers having different encoding rates.

11. The method according to claim 9, further comprising: allocating, by the circuitry acting under control of the computer-readable instructions stored in the non-transitory memory, a band to each of the plurality of client apparatuses in accordance with the encoding rate information.

12. The method according to claim 7, further comprising:
allocating, by the circuitry acting under control of the computer-readable instructions stored in the non-transitory memory, a band to each of the plurality of client apparatuses.

13. The method according to claim 12, further comprising:
allocating, by the circuitry acting under control of the computer-readable instructions stored in the non-transitory memory, a larger band to the priority apparatus than the band allocated to any client apparatuses other than the priority apparatus.

14. The non-transitory, computer-readable medium according to claim 8, storing the instructions that, when executed by the circuitry of the information processing apparatus, further control the circuitry to:
receive encoding rate information indicating an encoding rate of the data transmitted to each of the plurality of client apparatuses.

15. The non-transitory, computer-readable medium according to claim 14, wherein the data are transmitted from a plurality of servers having different encoding rates.

16. The non-transitory, computer-readable medium according to claim 14, storing the instructions that, when executed by the circuitry of the information processing apparatus, further control the circuitry to:
allocate a band to each of the plurality of client apparatuses in accordance with the encoding rate information.

17. The non-transitory, computer-readable medium according to claim 8, storing the instructions that, when executed by the circuitry of the information processing apparatus, further control the circuitry to:
allocate a band to each of the plurality of client apparatuses.

18. The non-transitory, computer-readable medium according to claim 17, storing the instructions that, when executed by the circuitry of the information processing apparatus, further control the circuitry to:
allocate a larger band to the priority apparatus than the band allocated to any client apparatuses other than the priority apparatus.

* * * * *